(12) United States Patent
Laforge et al.

(10) Patent No.: US 11,742,737 B2
(45) Date of Patent: Aug. 29, 2023

(54) LOW NOISE GEAR MOTOR WITH DISSYMETRIC ELECTRIC MOTOR

(71) Applicant: Moving Magnet Technologies, Besançon (FR)

(72) Inventors: Damien Laforge, Chemaudin et Vaux (FR); Lionel Billet, Dannemarie sur Crète (FR)

(73) Assignee: Moving Magnet Technologies, Besançon (FR)

( * ) Notice: Subject to any disclaimer, the term of this patent is extended or adjusted under 35 U.S.C. 154(b) by 0 days.

(21) Appl. No.: 17/595,489

(22) PCT Filed: May 15, 2020

(86) PCT No.: PCT/HR2020/050816
§ 371 (c)(1),
(2) Date: Nov. 17, 2021

(87) PCT Pub. No.: WO2020/234532
PCT Pub. Date: Nov. 26, 2020

(65) Prior Publication Data
US 2022/0255413 A1    Aug. 11, 2022

(30) Foreign Application Priority Data
May 17, 2019  (FR) ..................... 1905221

(51) Int. Cl.
*H02K 37/16* (2006.01)
*H02K 37/24* (2006.01)
*H02K 7/116* (2006.01)

(52) U.S. Cl.
CPC ........... *H02K 37/24* (2013.01); *H02K 7/1166* (2013.01); *H02K 37/16* (2013.01)

(58) Field of Classification Search
CPC ..... H02K 37/16; H02K 37/24; H02K 2213/03
See application file for complete search history.

(56) References Cited

U.S. PATENT DOCUMENTS

| | | | | |
|---|---|---|---|---|
| 5,432,644 | A | * | 7/1995 | Tajima .................. G11B 19/20 360/99.04 |
| 2014/0103769 | A1 | * | 4/2014 | Kingrey .............. H02K 1/2773 29/598 |
| 2018/0219435 | A1 | * | 8/2018 | Billet ...................... H02K 1/14 |

FOREIGN PATENT DOCUMENTS

| | | |
|---|---|---|
| EP | 3483454 A1 | 5/2019 |
| EP | 3010127 B1 | 12/2019 |
| WO | 2017/013266 A1 | 1/2017 |

OTHER PUBLICATIONS

International Search Report for International Application No. PCT/FR2020/050816 dated Sep. 17, 2020, 2 pages.

(Continued)

*Primary Examiner* — Dang D Le
(74) *Attorney, Agent, or Firm* — TraskBritt

(57) ABSTRACT

A gear motor comprising a reduction gear train and a three-phase electric motor comprising a stator formed of a stack of sheets and 3*k electric coils and a rotor having 5 k*N pairs of magnetized poles, with k=1 or 2, the stator having two separate angular sectors alpha 1 and alpha 2, which are centered on the center of rotation of the motor and comprise an alternation of notches and 3*k*N teeth, which are regularly spaced and converge toward the center of rotation and define a cavity in which the rotor is arranged, the gear motor being characterized in that N=4 and in that alpha 1 is less than or equal to 180° and comprises all of the coils of the motor.

16 Claims, 27 Drawing Sheets

(56) References Cited

OTHER PUBLICATIONS

International Written Opinion for International Application No. PCT/FR2020/050816 dated Sep. 17, 2020, 6 pages.

* cited by examiner

LOW NOISE GEAR MOTOR WITH DISSYMETRIC ELECTRIC MOTOR

CROSS-REFERENCE TO RELATED APPLICATIONS

This application is a national phase entry under 35 U.S.C. § 371 of International Patent Application PCT/FR2020/050816, filed May 15, 2020, designating the United States of America and published as International Patent Publication WO 2020/234532 A1 on Nov. 26, 2020, which claims the benefit under Article 8 of the Patent Cooperation Treaty to French Patent Application Serial No. FR1905221, filed May 17, 2019.

TECHNICAL FIELD

The present disclosure relates to the field of gear motors, that is to say, devices associating an electric motor with a speed or movement reduction gear train (speed multiplier), and more particularly to gear motors using a surface-mounted permanent magnet brushless polyphase motor with dissymmetry at the motor stator.

BACKGROUND

Known from document EP3483454 is the use of a stator comprising a magnetic armature, three coils mounted on branches of the magnetic armature arranged asymmetrically around the rotor, and, in particular, arranged in an arc of circle of less than 180 degrees around the rotor. Poles of the stator on the opposite side of the coils are formed by teeth of the armature without coils, which makes it possible to have a small diameter stator on the opposite side of the coils. The rotor has 5 pairs of poles.

Furthermore, document WO2017013266 is known, which presents a brushless motor having at least two electrical phases, a rotor rotating about an axis, and made up of a stator assembly having at least two poles each bearing coils, the winding axes of which are spaced apart by a mechanical angle of less than 180°.

Also known is patent application EP3010127, presenting a motor whose rotor comprises four pairs of S-poles and a stator comprising six poles. Two wound stator poles are angularly offset with respect to each other by 112.5°.

The object of these devices of the prior art is to solve the general problem of minimizing the torque without current of the motors in order to avoid noise and wear of the components.

However, when one wishes to use a compact and silent gear motor, although the choices offered by the aforementioned documents in terms of stator tooth widths allow the residual torque (without current) to be minimized, the number of pairs of poles on the taught rotor does not, in association with an asymmetrical stator, allow a silent drive to be achieved.

Indeed, it has been observed that using a rotor with 5 pairs of poles in magnetic interaction with an asymmetrical wound stator having narrow teeth and as presented in these documents can prove to be unfavorable in terms of acoustic emission due to the transverse forces—reference is then made to radial forces—exerted between the stator and the rotor when the coils are activated. In particular, it was noted that a three-phase type power supply, whether it is sinusoidal, block or multi-step, in the case where a rotor with 5 pairs of surface-mounted poles is used, generates significant transverse forces between the stator and the rotor relative to the residual force and in certain cases promotes vibrations by stressing resonant frequencies (natural modes) of the structure.

BRIEF SUMMARY

The present disclosure aims to overcome the drawbacks of the state of the art by producing a compact and silent gear motor. The present disclosure more particularly aims to combine a reduction gear train with a particular stator and rotor making it possible to minimize the acoustic emissions by reducing the transverse forces between stator and rotor while maintaining an acceptable residual torque.

Another object of the present disclosure is to minimize the variations of these transverse forces to the positioning tolerances of the rotor relative to the rotor.

To do this, it has been surprisingly observed that using a rotor having 4 pairs of poles interacting with a three-phase asymmetrical stator leads to drive solutions that are quieter than those of the prior art independent of the type of motor power. When combined with a mechanical gear reducer, the obtained solution is compact and silent. During the eccentricity of the rotor, the variation of these forces is even minimized compared to the solutions of the state of the art.

More particularly, the present disclosure relates to a gear motor comprising a reduction gear train and a three-phase electric motor comprising a stator formed by a stack of sheets and a number of electric coils that is a multiple of 3 and a rotor having k*N pairs of magnetized poles, with k=1 or 2, the stator having two separate angular sectors alpha 1 and alpha 2, which are centered on the center of rotation of the motor and comprise an alternation of notches and 3*k*N teeth, which are regularly spaced and converge toward the center of rotation and define a cavity in which the rotor is arranged, characterized in that N=4 and in that alpha 1 is less than or equal to 180° and comprises all of the coils of the motor, the number of coils being less than or equal to half the number of teeth. This configuration, in particular, makes it possible to obtain the advantages referred to above. "Regularly spaced" means that the angular distance between the teeth from the center of rotation is constant. A "magnetized pole" designates a permanent magnet.

In a first embodiment, the teeth comprise an alternation of wide and narrow teeth, the wide teeth having a width greater than or equal to twice the width of the narrow teeth, and the notch width is greater than the width of a narrow tooth.

In another embodiment, the teeth all have an identical width such that the width is less than or equal to the notch width.

In another embodiment, the teeth are identical and have pole heads flared toward the rotor such that the width of the pole heads is greater than the notch width.

The rotor is preferably borne by a non-magnetic support, although the use of a magnetic yoke can be envisaged. The non-magnetic support may be made from an injected material also forming a pinion for driving the gear train. A non-magnetic support is preferred for the rotor when considering pole-type magnetization, but is not required if the magnet is thick or if it is desired to make a sintered steel pinion secured to this support.

In an alternative embodiment, k=2 and the motor comprises two coils per electrical phase. This embodiment makes it possible, in particular, to increase the torque of the gear motor with a given gear train.

In a variant, the reduction gear train is formed by a worm driving a threaded rod.

BRIEF DESCRIPTION OF THE FIGURES

Other features and advantages of the present disclosure will emerge on the following reading of detailed embodiments, with reference to the accompanying figures, which respectively show:

FIGS. 1b, 2b and 3b are top views of the stators, respectively, of FIGS. 1a, 2a, 3a;

FIGS. 1c, 2c and 3c are perspective views of electric motors using the stators, respectively, of FIGS. 1a, 2a and 3a;

DETAILED DESCRIPTION

Figure 1A:
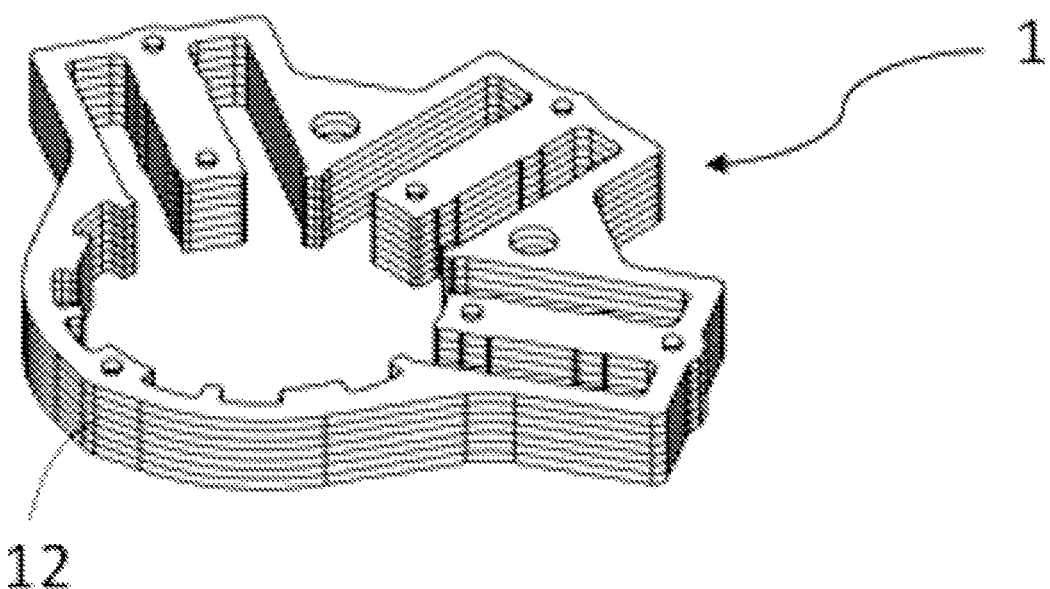
FIGS. 1a, 2a and 3a are isolated perspective views of various stators of a gear motor according to the present disclosure.
Figure 1B:
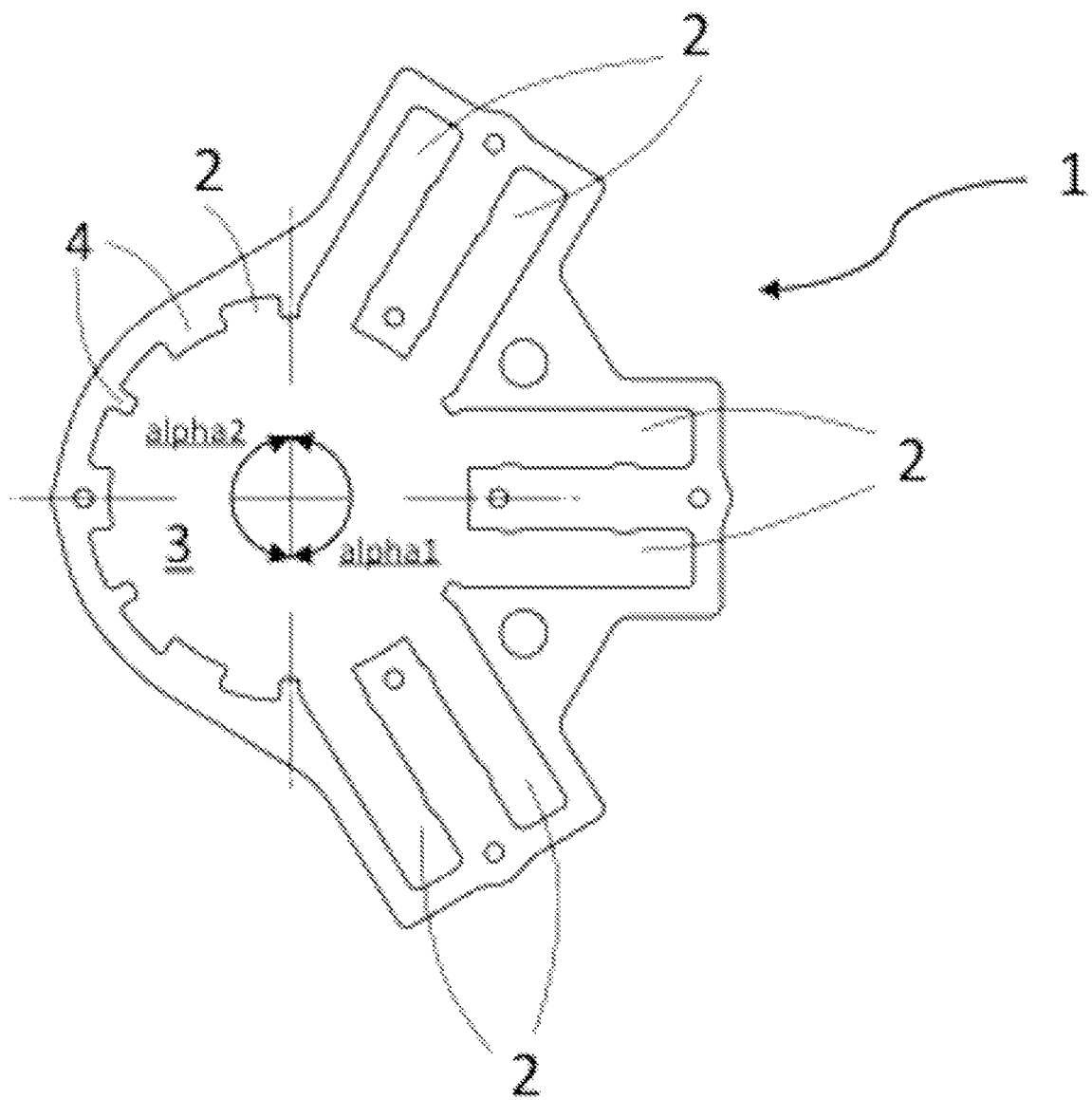
Figure 1C:
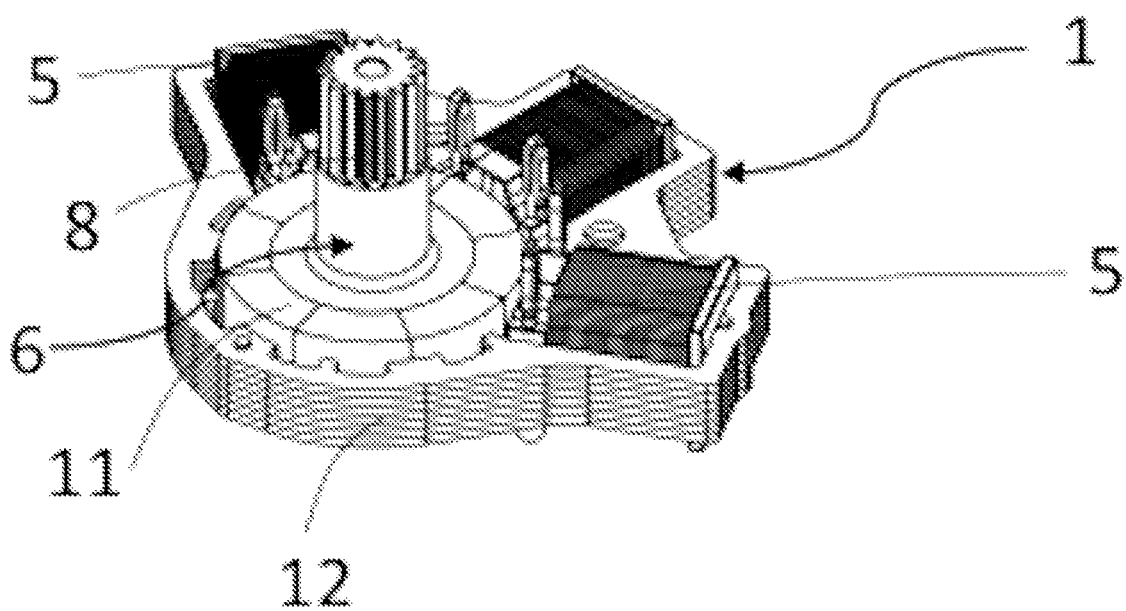

FIGS. 1a and 1b show a first example of a stator with twelve teeth of a three-phase motor of a gear motor according to the present disclosure. This stator (1) is formed by a stack of sheets (12) forming a first angular sector (alpha 1) extending over approximately 180°—to within a few degrees and from the center of rotation—, partially delimiting a cylindrical cavity (3) whose diameter is formed by an alternation of notches (2) and teeth (4), the notches (2) being intended to receive three electric coils for the creation of a rotating stator field and the teeth having alternating narrow and wide angular widths, the "wide" angular width being greater than twice the "narrow" angular width. The angular width is considered from the center of rotation of the motor and in tangency with the end of the teeth (4).

A second sector extending over the remaining 180° arc (alpha 2), partially delimiting the cylindrical cavity (3), the diameter of which is also formed by an alternation of notches (2) and teeth (4), the notches (2) not receiving any electric coils and the teeth having alternately narrow and wide angular widths, the "wide" angular width being greater than twice the "narrow" angular width. The angular width is considered from the center of rotation of the motor and in tangency with the end of the teeth (4).

Figure 2A:
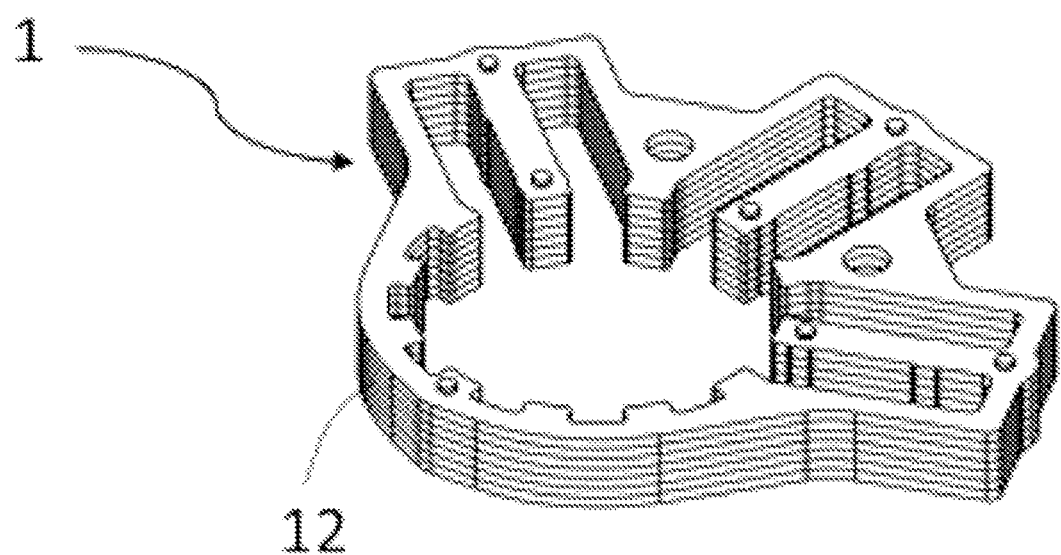
Figure 2B:
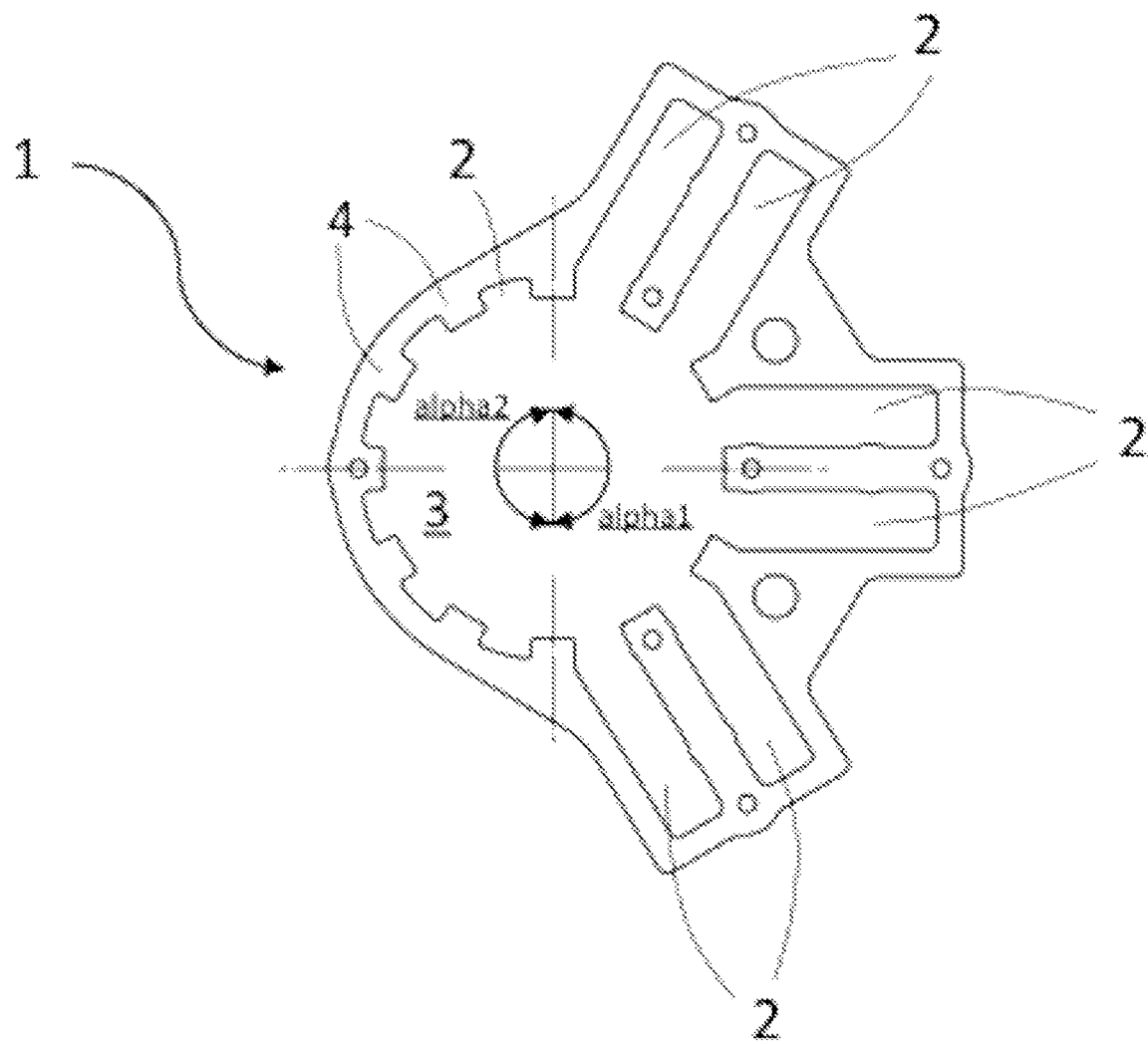
Figure 2C:
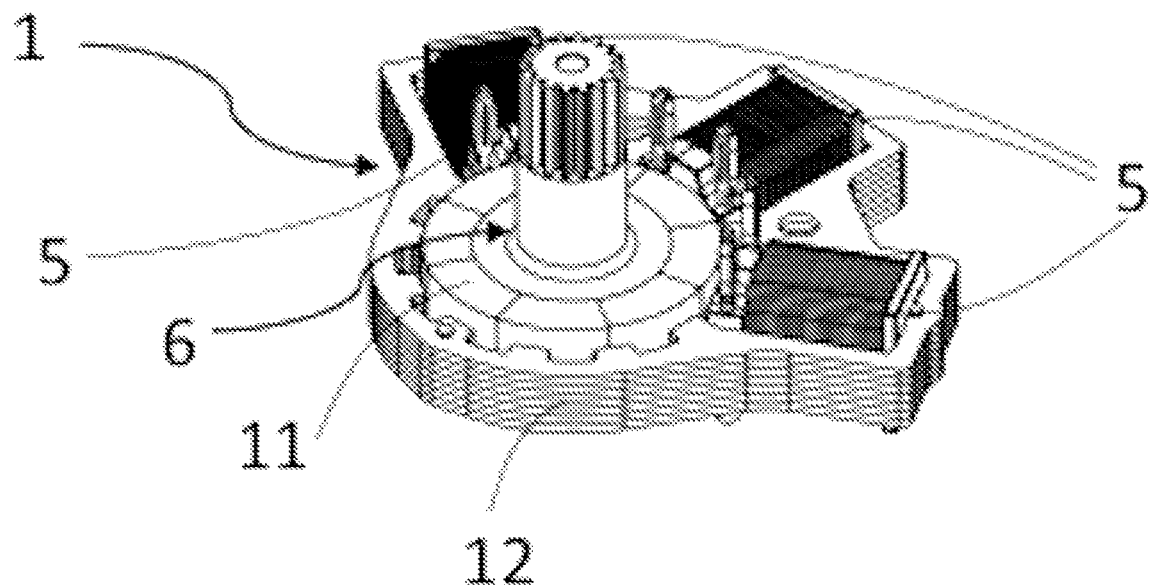

FIGS. 2a and 2b show a second example of a stator with twelve teeth of a three-phase motor of a gear motor according to the present disclosure. This stator (1) is formed by a stack of sheets (12) forming a first angular sector (alpha 1) extending over approximately 180°—to within a few degrees and from the center of rotation—, partially delimiting a cylindrical cavity (3) whose diameter is formed by an alternation of notches (2) and teeth (4), the notches (2) being intended to receive three electric coils for the creation of a rotating stator field and the teeth having constant angular widths, the angular width being at most equal to the angular width of the notches. The angular width is considered from the center of rotation of the motor and in tangency with the end of the teeth (4).

A second sector extending over the remaining 180° arc (alpha 2), partially delimiting the cylindrical cavity (3), the diameter of which is also formed by an alternation of notches (2) and teeth (4), the notches (2) not receiving any electric coils and the teeth having constant angular widths, the angular width being at most equal to the angular width of the notches. The angular width is considered from the center of rotation of the motor and in tangency with the end of the teeth (4).

A stator according to FIGS. 1a, 1b or 2a, 2b, in particular, allows the electric coils (5) to be slid on the stator after completion of the latter.

Figure 3A:
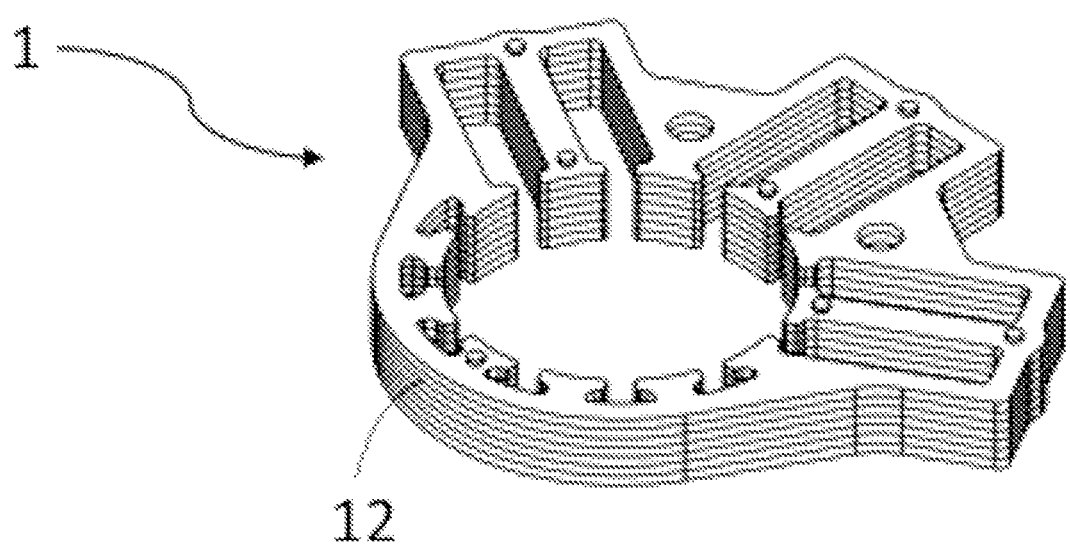
Figure 3B:
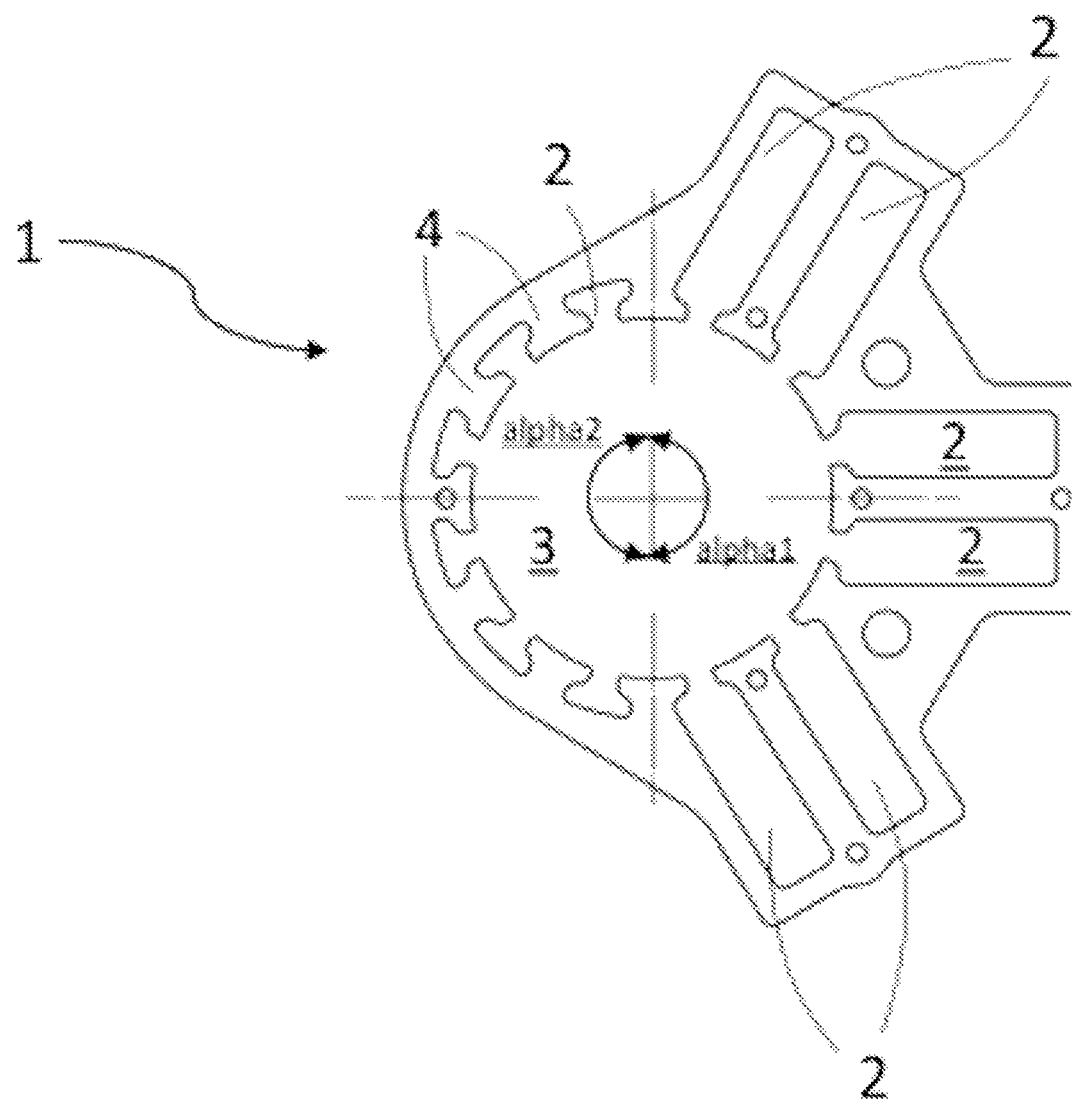
Figure 3C:
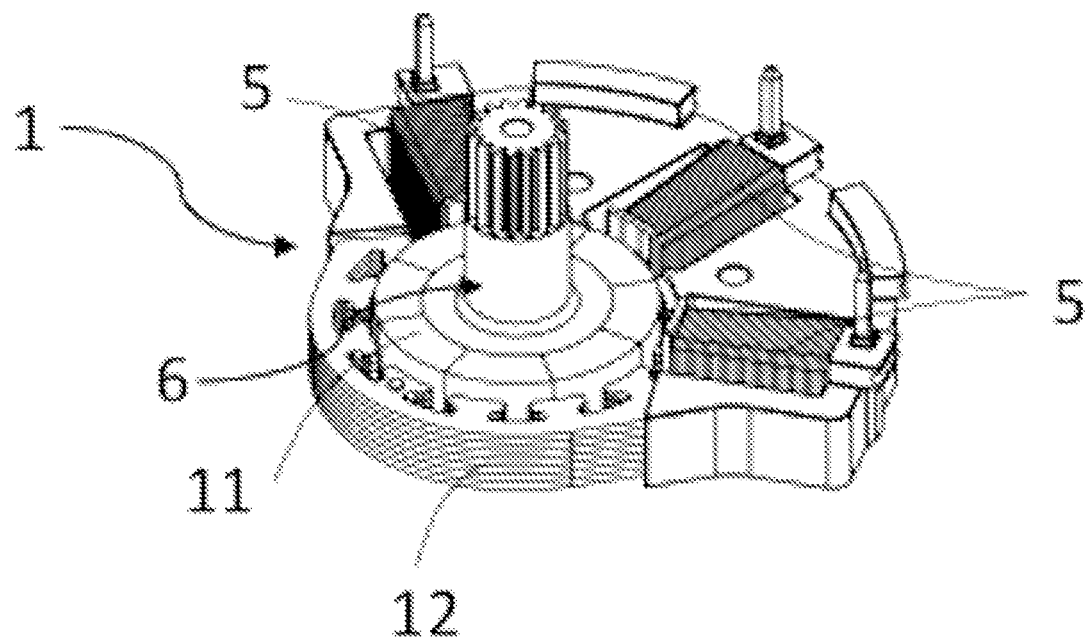

FIGS. 3a and 3b show a third example of a stator with twelve teeth of a three-phase motor of a gear motor according to the present disclosure. This stator (1) is formed by a stack of sheets (12) forming a first angular sector (alpha 1) extending over approximately 180°—to within a few degrees and from the center of rotation—, partially delimiting a cylindrical cavity (3) whose diameter is formed by an alternation of notches (2) and teeth (4), the notches (2) being intended to receive three electric coils for the creation of a rotating stator field and the teeth having constant angular widths, the angular widths being formed by pole heads that are wider toward the cavity (3) and that are at least equal to the angular width of the notches. The angular width is considered from the center of rotation of the motor and in tangency with the end of the teeth (4).

A second sector extending over the remaining 180° arc (alpha 2), partially delimiting the cylindrical cavity (3), the diameter of which is also formed by an alternation of notches (2) and teeth (4), the notches (2) not receiving any electric coils and the teeth having constant angular widths, the angular width being formed by pole heads that are wider toward the cavity (3) and that are at least equal to the angular width of the notches. The angular width is considered from the center of rotation of the motor and in tangency with the end of the teeth (4).

For this last embodiment of FIGS. 3a and 3b, the coils (5) must be made—wound—directly on the teeth (4).

The various FIGS. 1c to 1e, 2c to 2e and 3c to 3e show the complete motors associated with the stators described above with the various coils (5) placed on the teeth (4) at the notches (2) as well as the rotors (6) placed inside the cavities (3). The width of the coils (5) depends on the width of the notches (2) as a function of the widths of the ends of the teeth (4). The rotors (6) comprise a multipolar magnet (11) having four alternations of North and South poles (reference is made to four pairs of poles, or four North-South vibrations), each pole being able to present an outgoing/incoming radial magnetization or an inward/outward unidirectional magnetization or a magnetization of the polar type or any known magnetization carrying out an alternation of magnetized poles. These magnets here are borne by a non-magnetic support (7), typically made of injected plastic, bearing a pinion (8) intended to drive a reduction gear train. The pinion (8) is preferably, but non-limitingly, made of the same material as that of the support (7) and preferably at the same time during the injection.

Figure 1D:
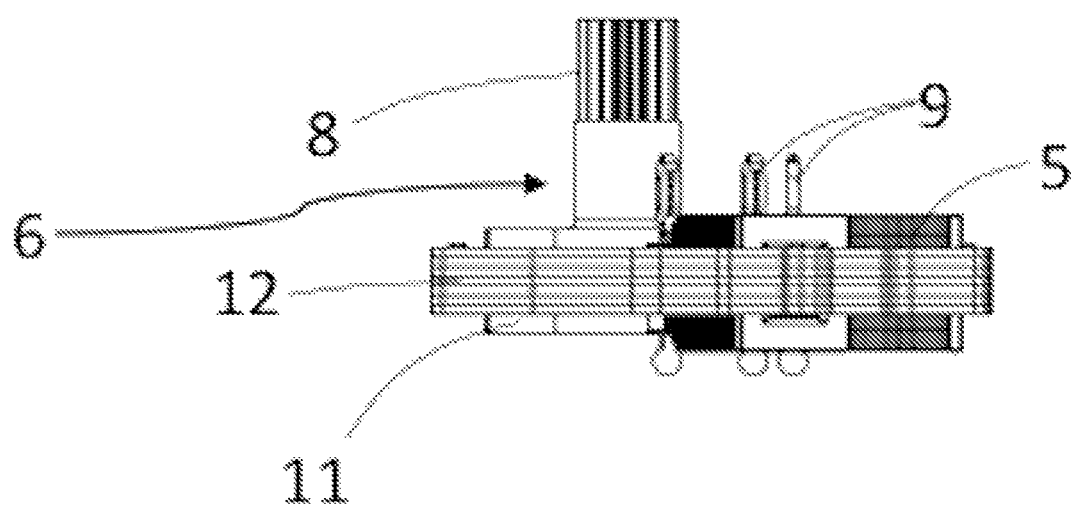
FIGS. 1d, 2d and 3d are side views of the motors, respectively, of FIGS. 1c, 2c and 3c.
Figure 1E:
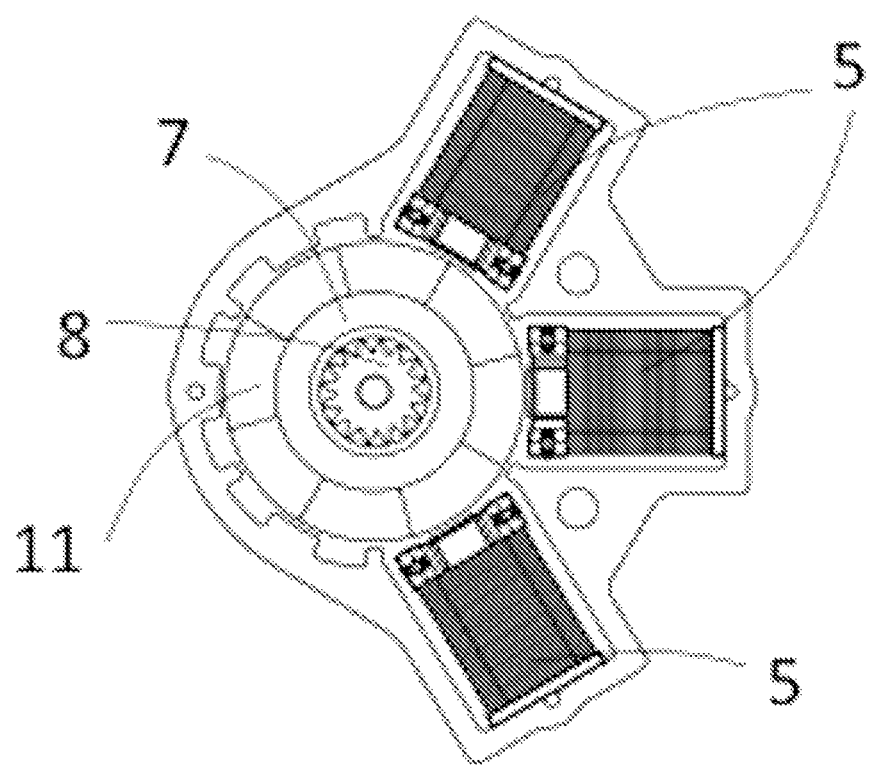
FIGS. 1e, 2e and 3e are top views of the motors, respectively, of FIGS. 1c, 2c and 3c.
Figure 2D:
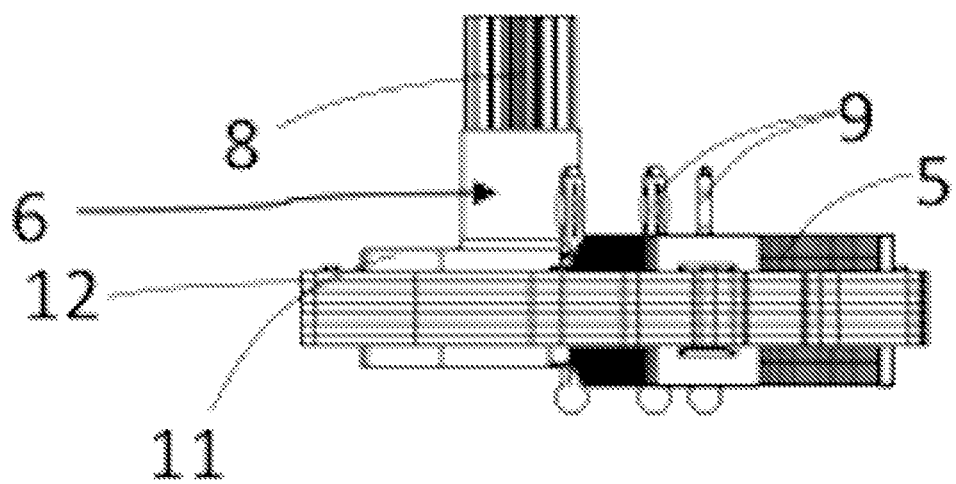
Figure 2E:
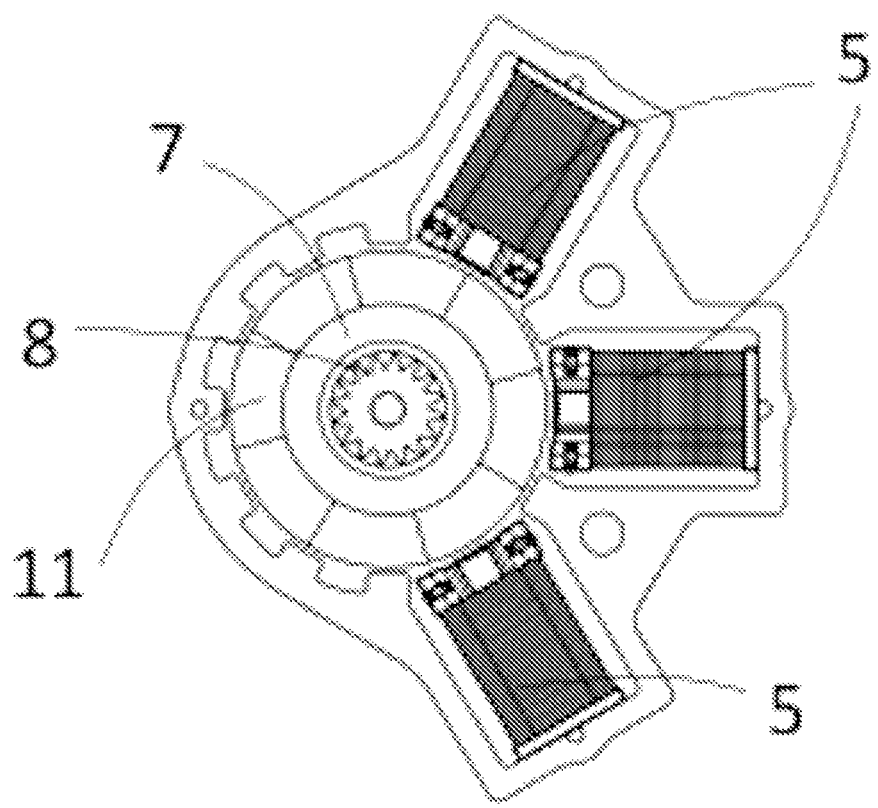
Figure 3D:
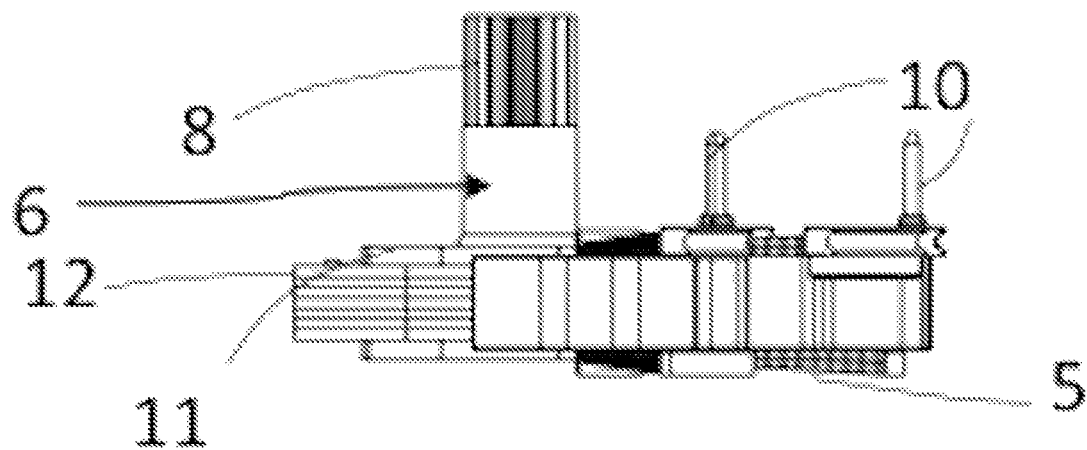
Figure 3E:
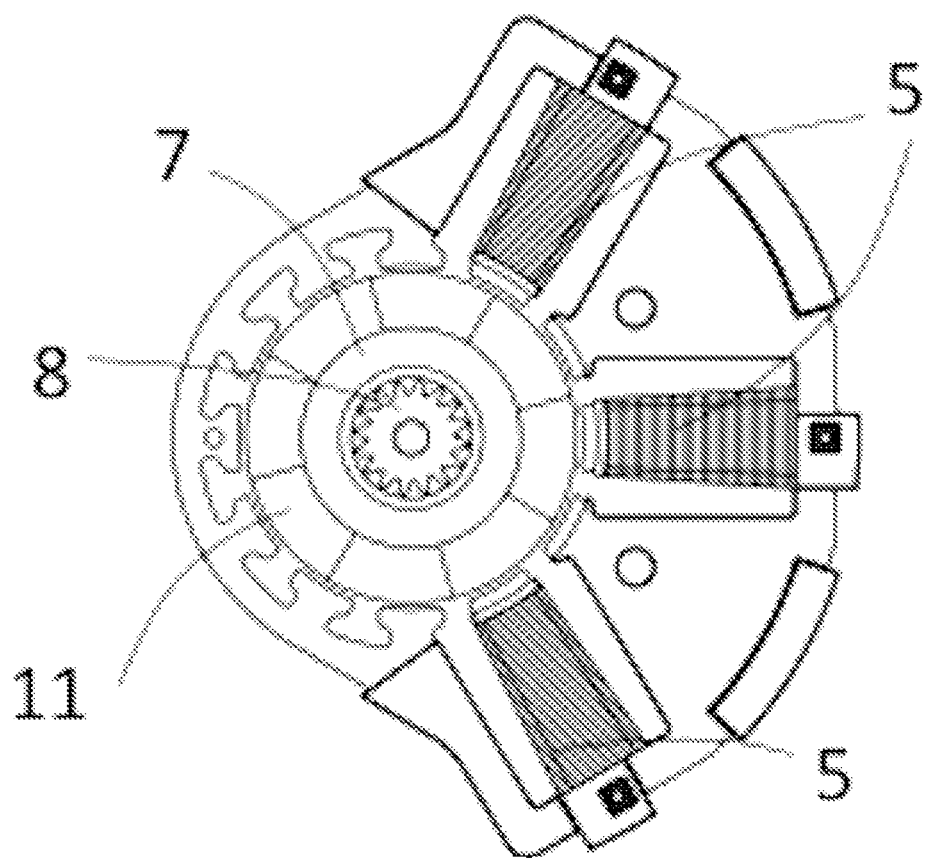

As illustrated in FIGS. 1d, 2d and 3d, the rotor is preferably of greater axial height than that of the sheets (12) of the stator (1) in order to maximize the magnetic flux produced by the magnets and collected by the coils (5) without penalizing the total axial height of the motor. The coil (5) connections are made to a printed circuit (not shown) using either press-fit type contacts (9) or lugs (10) to be soldered or inserted into suitable contacts.

Figure 4:
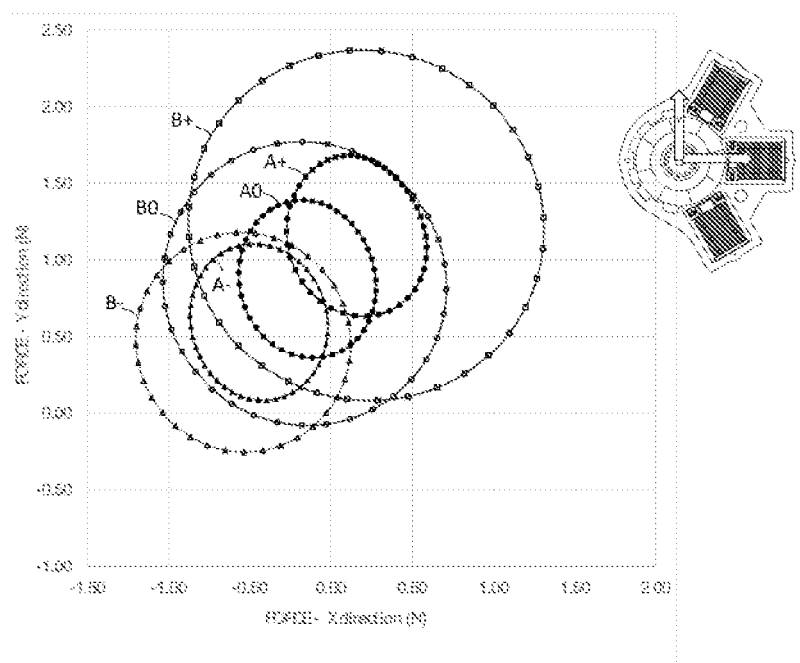
FIG. 4 is a graph showing the evolution of the forces on the rotor.

FIG. 4 presents a graph showing the typical performance obtained by a gear motor according to the present disclosure, according to index (A), in comparison with a gear motor having a motor with 5 pairs of poles, according to index (B), in terms of radial forces exerted on the rotor when the coils are supplied with a variable current (here according to a sinusoidal-type control with an amplitude of 200 ampere-turns per coil) and when the rotor is centered, index (0), eccentric +0.035 mm in the X direction and in the Y direction, with index (+), i.e., 0.05 mm total eccentricity, or offset by −0.035 mm in these same directions, index (−).

For a gear motor of the prior art with a centered rotor, index (BO), during the rotation of the rotor, the amplitude of the radial forces describes a circle, varying from −1 N to +0.75 N along X and from −0.25 N to approximately 1.75 N along Y. With the same dimensions and under the same usage conditions, a gear motor according to the present disclosure, index (AO), the amplitude of the radial forces describes an ellipse, varying from −0.5 N to +0.25 N along X and from 0.4 N to 1.4 N approximately along Y, i.e., a significant decrease in the oscillation of the radial force.

When the rotor is eccentric, these variations are even more reduced for a gear motor according to the present disclosure in comparison with the prior art, as shown in FIG. 4, demonstrating the greater robustness of this solution. Indeed, with an eccentricity of +0.035 mm, index (B+), the motor according to the prior art experiences the greatest variation in force, with an amplitude of the radial forces describing a circle, varying from −0.9 N to +1.35 N along X and from 0.0 N to 2.4 N approximately along Y. Under the same conditions, index (A+), the motor according to the present disclosure exhibits half the variation in force.

Figure 5A:
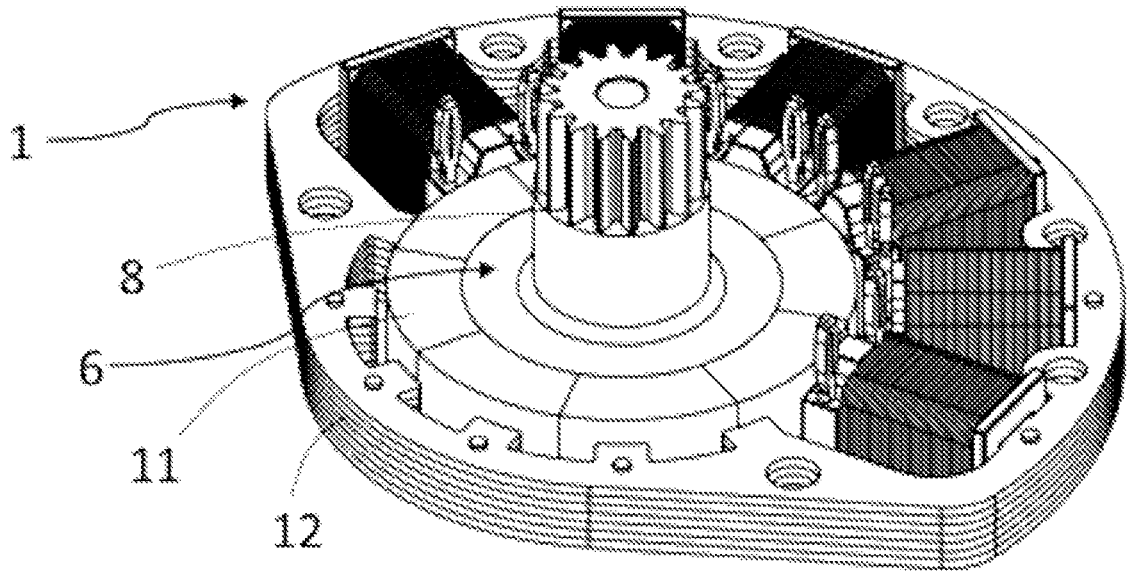
FIGS. 5a, 5b and 5c are views, respectively in perspective, from the side and from above, of another embodiment of a motor belonging to a gear motor according to the present disclosure.
Figure 5B:
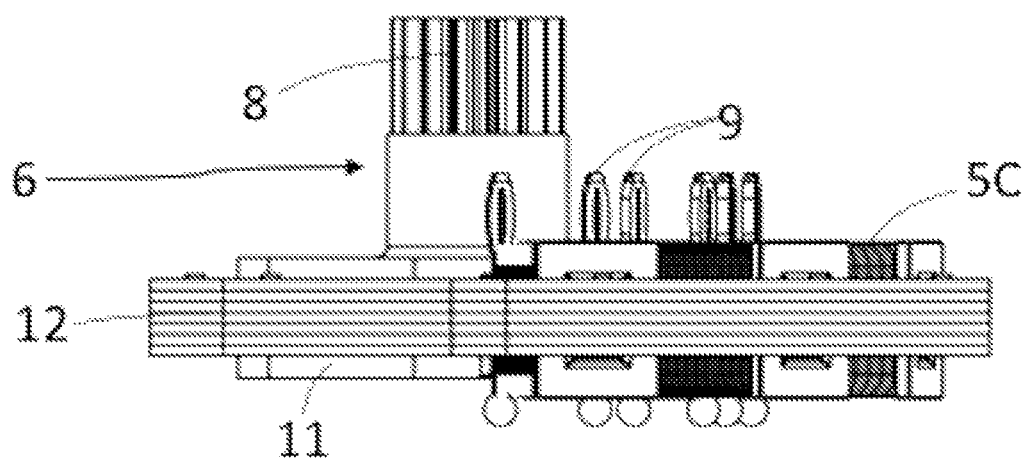
Figure 5C:
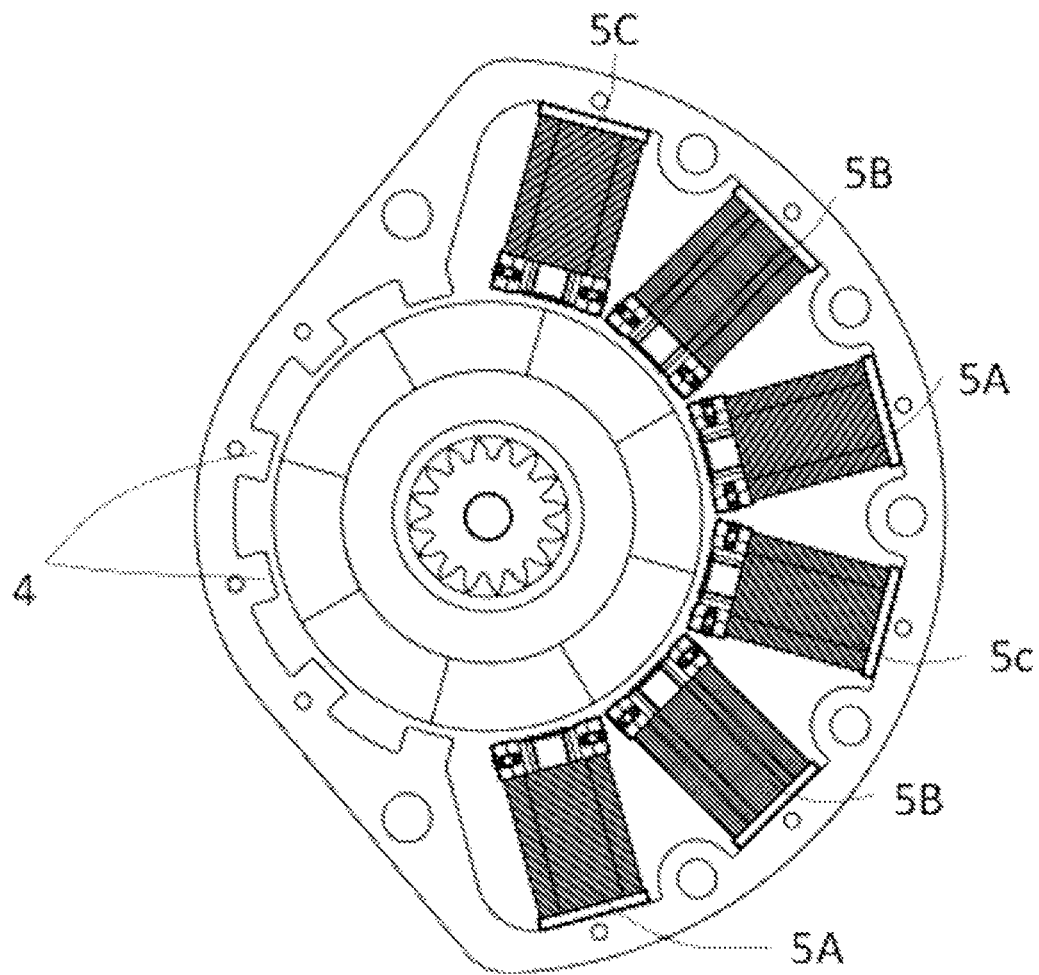

FIGS. 5a, 5b and 5c show an alternative embodiment of a motor used in a gear motor according to the present disclosure that has two coils per phase for a total of six coils (5A, 5B, 5C), still with a stator (1) having twelve teeth (4), here of equal width, and a rotor having four pairs of poles. The indices A, B and C refer to each phase. These are spaced 30° mechanically from each other, i.e., 30° *4=120° electric. Two coils belonging to a phase are spaced 90° mechanically from each other, so 90° *4=360°=0° electric.

Figure 6A:
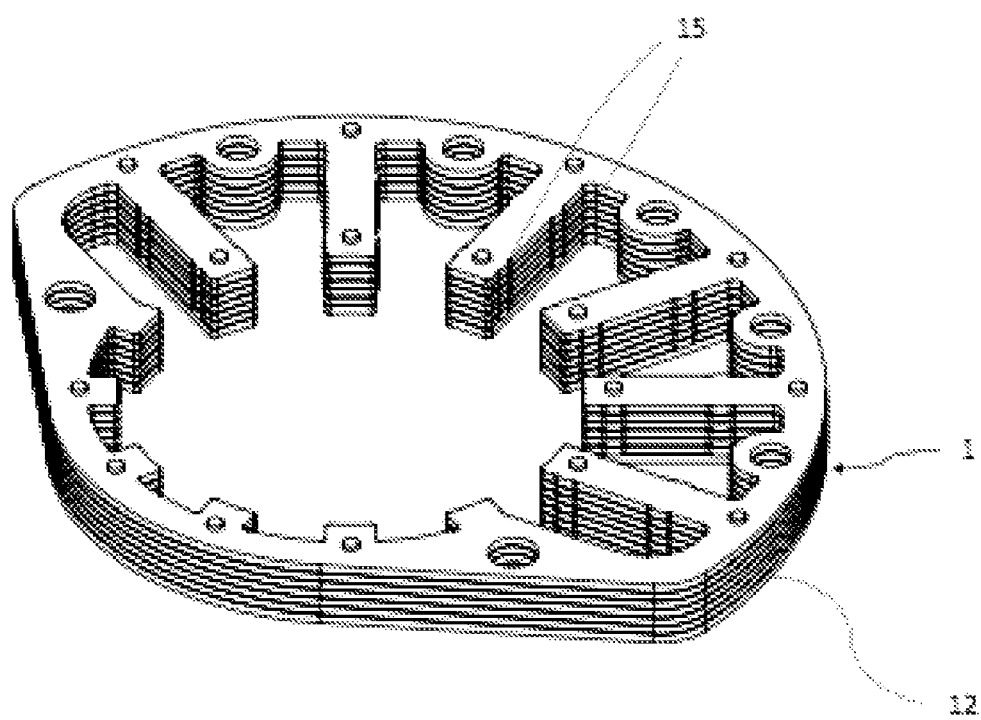
FIGS. 6a and 6b are isolated views, respectively in perspective and from above, of the stator of the embodiment of FIGS. 5a to 5c.
Figure 6B:
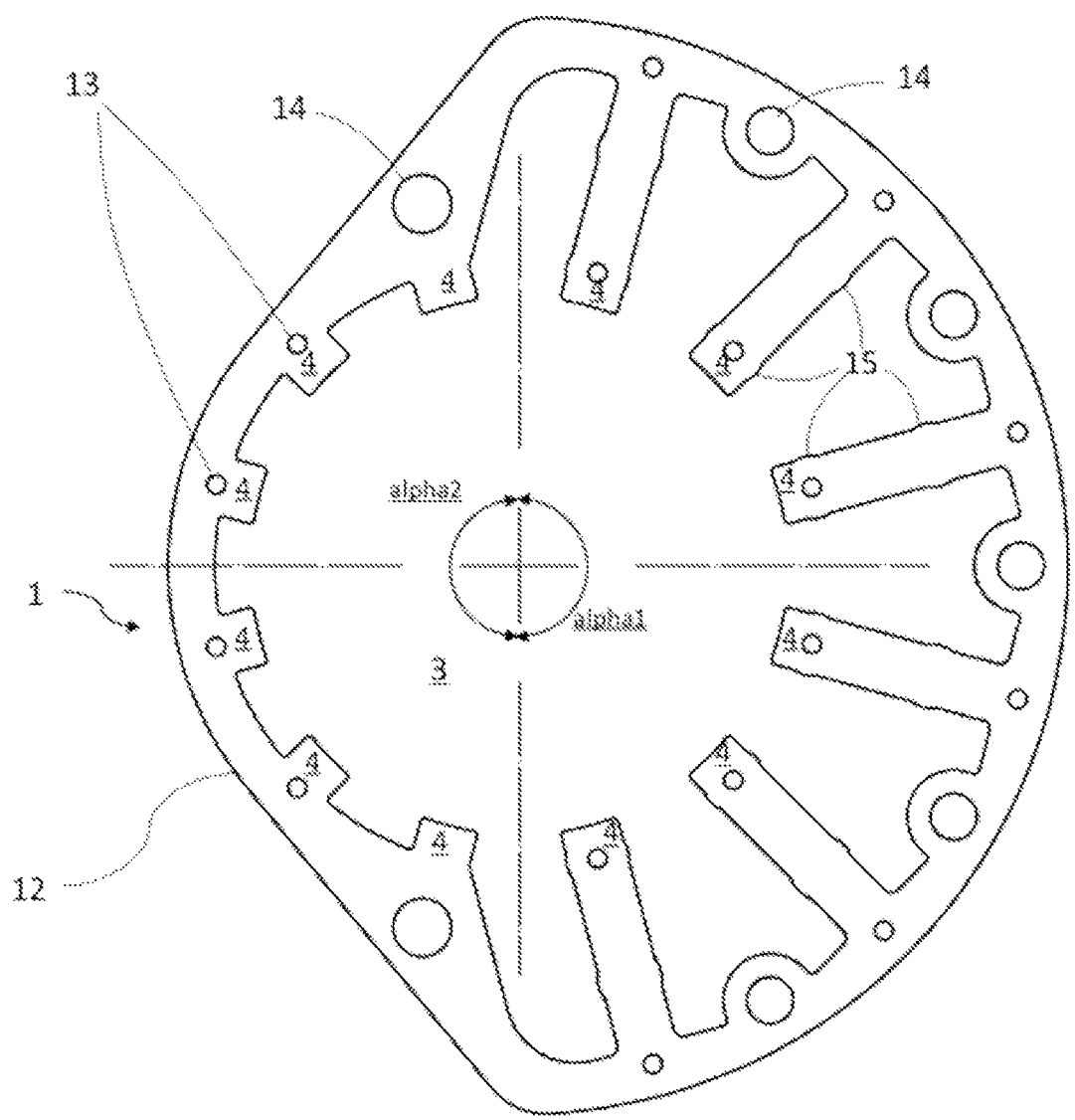

FIGS. 6a and 6b are two isolated views of the stator (1) of the motor variant shown in FIGS. 5a, 5b and 5c. They make it possible to evaluate the angular sectors alpha 1, on which the electric coils are mounted in the notches (2), and alpha 2, on which no coil is mounted. In this example, the twelve teeth (4) are all identical, are straight and have an angular width at most equal to the notch width. Teeth widths as shown and described with reference to FIGS. 1b and 3b are also possible. The various round marks (13) relate to the stapling of the stack of sheets (12). The various holes (14) are used to position and fix the motor in the gear motor or in the application in which the motor is used. The bulges (15) present on the sides of the teeth (4) serve to hold and constrain the coils during and after their insertion on the teeth (4). These bulges (15) are produced directly on the stack of sheets during their production, by stamping, for example.

Figure 7A:
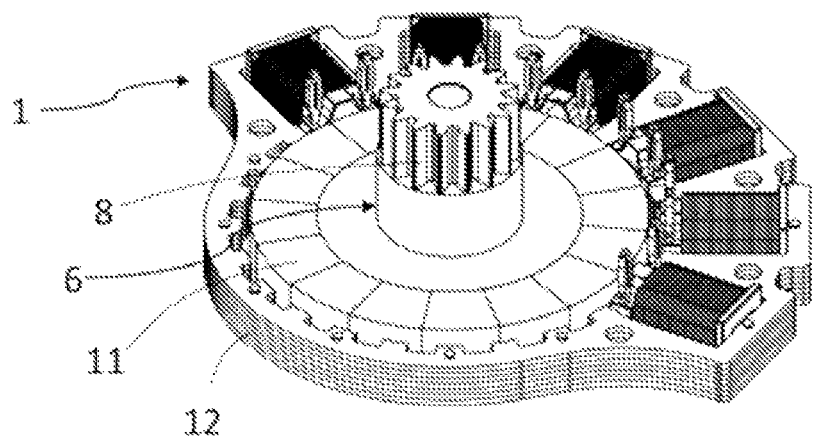
FIGS. 7a, 7b and 7c are views, respectively in perspective, from the side and from above, of another embodiment of a motor belonging to a gear motor according to the present disclosure.
Figure 7B:
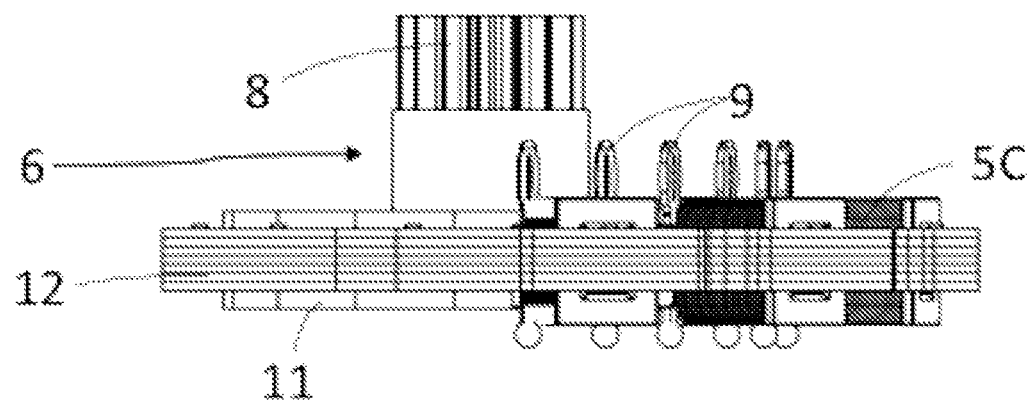
Figure 7C:
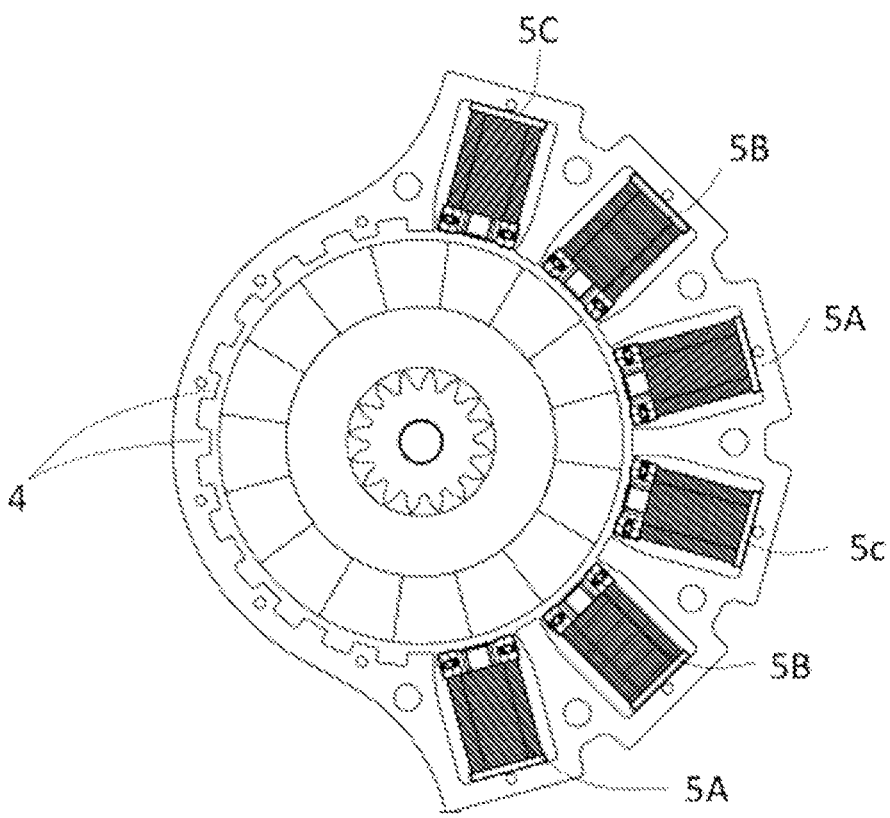

FIGS. 7a, 7b and 7c show another alternative embodiment of a motor used in a gear motor according to the present disclosure that has two coils per phase for a total of six coils (5A, 5B, 5C), with a stator (1) having twenty-four teeth (4), here of equal width, and a rotor having eight pairs of poles. The indices A, B and C refer to each phase. They are spaced 15° mechanically from each other, i.e., 15*8=120° electric. Two coils belonging to a phase are spaced 90° mechanically from each other, so 90*8=720°=0° electric.

Figure 8A:
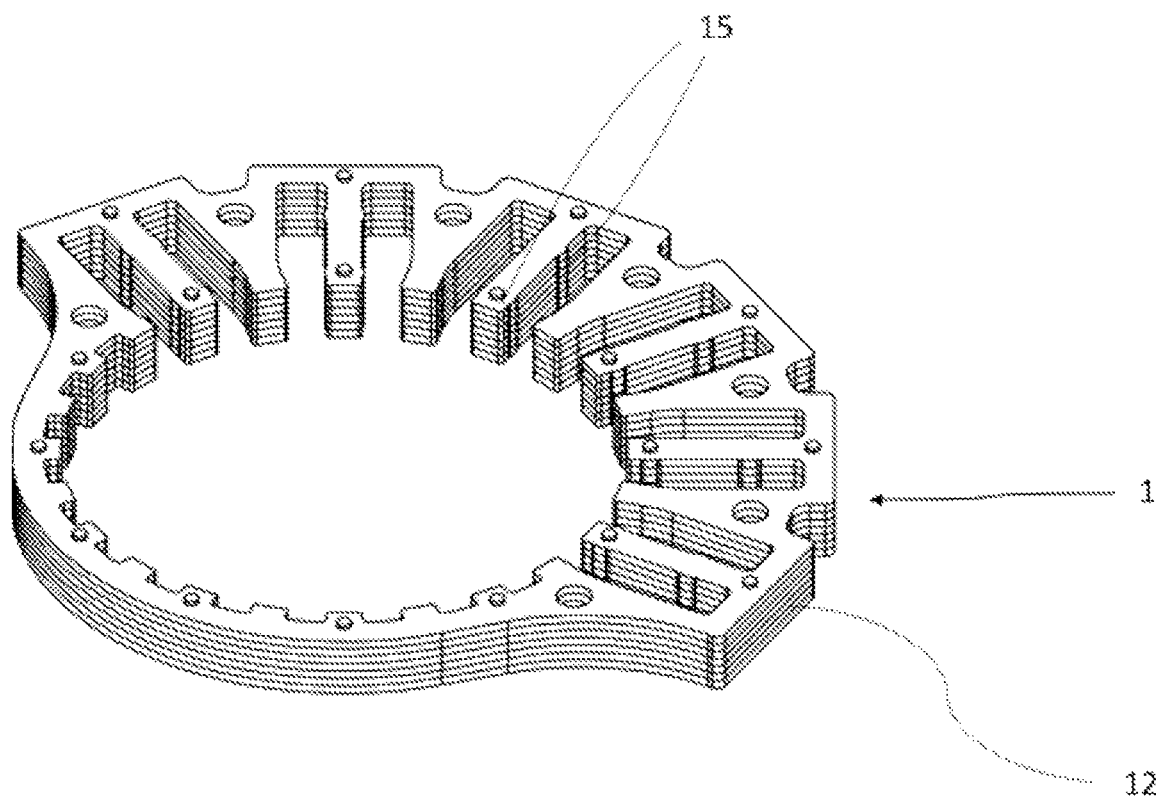
FIGS. 8a and 8b are isolated views, respectively in perspective and from above, of the stator of the embodiment of FIGS. 7a to 7c.
Figure 8B:
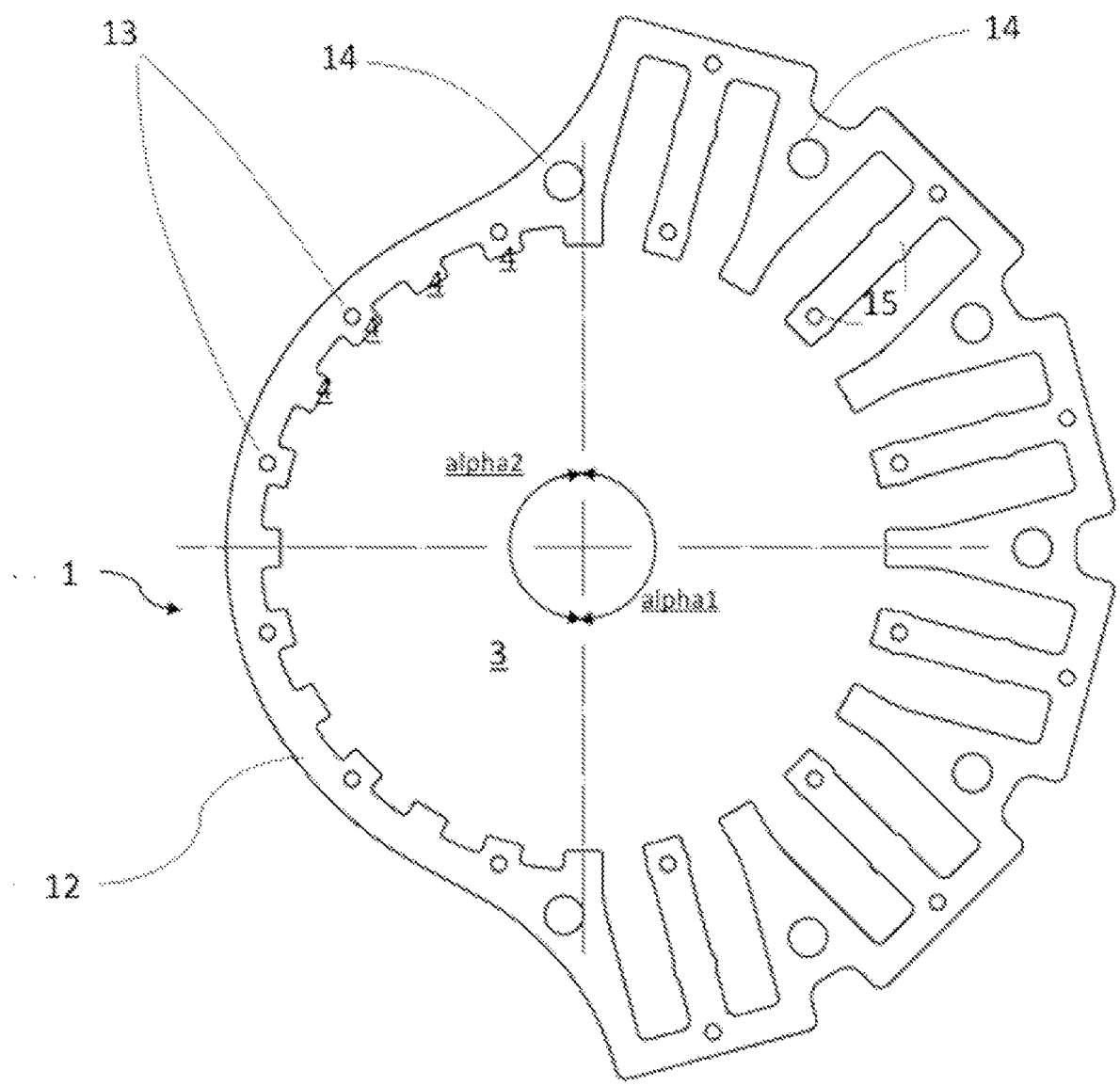
Figure 9A:
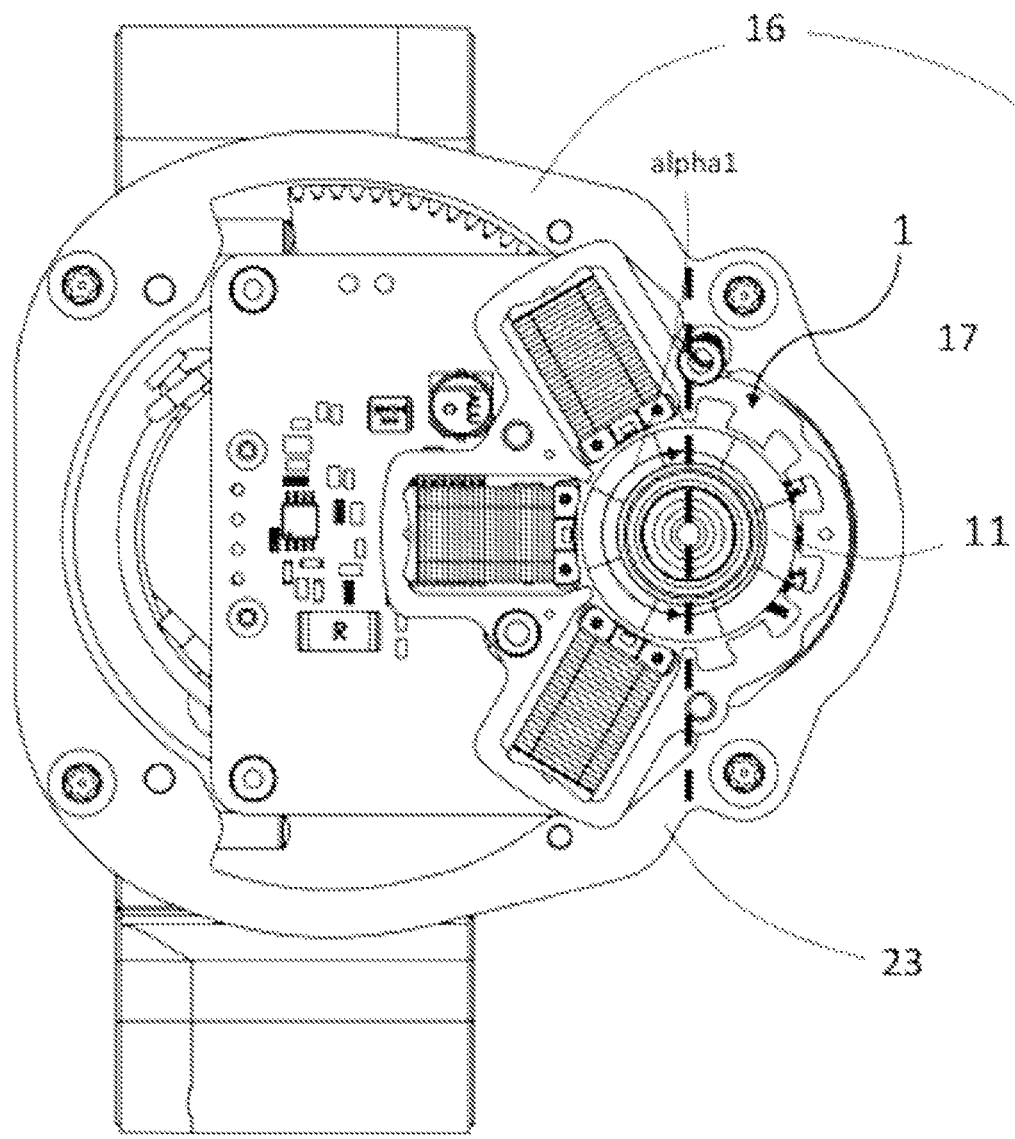
FIGS. 9a and 9b are top views without cover, of an example of a gear motor according to the present disclosure, using a motor as shown in FIGS. 1c to 1e.
Figure 9B:
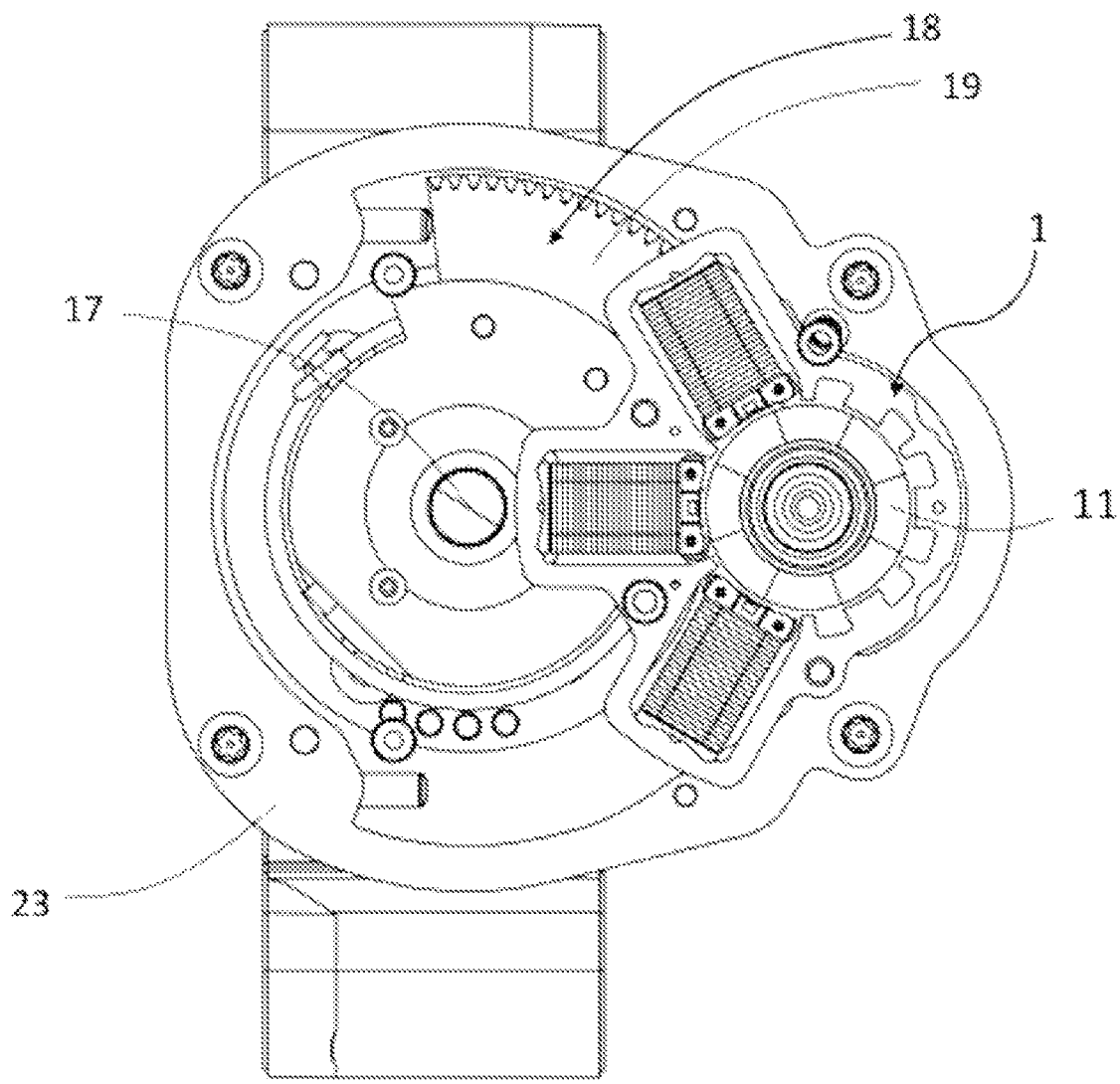
Figure 9C:
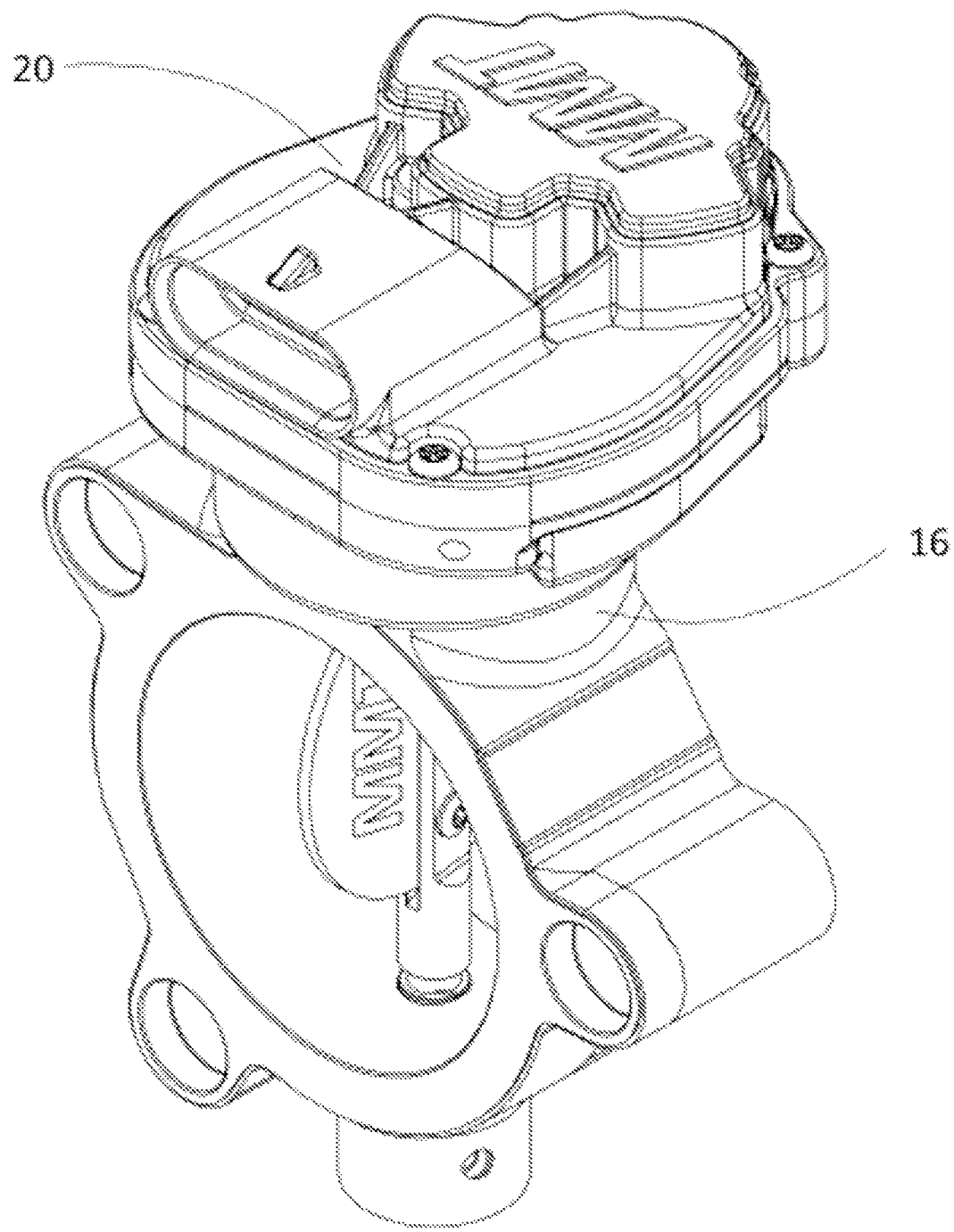
FIGS. 9c and 9d are perspective views, respectively with and without cover, of the same example of the gear motor of FIGS. 9a and 9b.
Figure 9D:
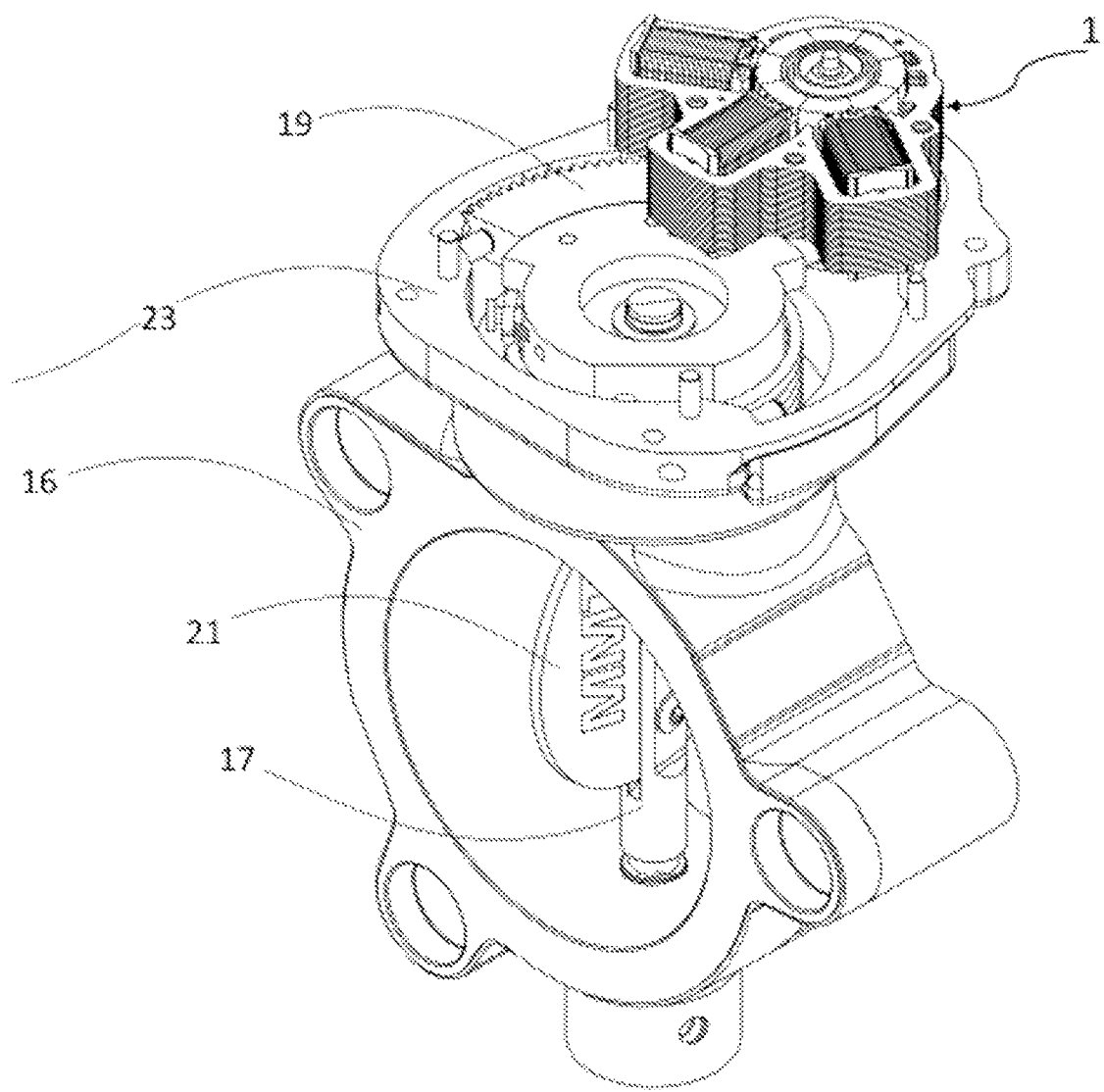

FIGS. 8a and 8b are two isolated views of the stator (1) of the motor variant shown in FIGS. 7a, 7b and 7c. They make it possible to evaluate the angular sectors alpha 1, on which the electric coils are mounted in the notches (2), and alpha 2, on which no coil is mounted. In this example, the twenty-four teeth (4) are all identical, are straight and have an angular width at most equal to the notch width. Teeth widths as shown and described with reference to FIGS. 1b and 3b are also possible. The various round marks (13) relate to the stapling of the stack of sheets (12). The various holes (14) are used to position and fix the motor in the gear motor or in the application in which the motor is used. The bulges (15) present on the sides of the teeth (4) serve to hold and constrain the coils during and after their insertion on the teeth (4). These bulges (15) are produced directly on the stack of sheets during their production, by stamping, for example.

FIGS. 9a to 9d show a first embodiment of a gear motor according to the present disclosure. The motor used is identical to that shown in FIGS. 1c to 1e. The latter is installed on a valve body (16), the sector alpha 1 facing the side of the rotating shaft (17) of the valve in order to place the motor as close as possible to the edge of the valve body (16) and thus to increase the magnet (11)/rotating shaft (17) center distance and thus the lever arm on the reduction stage of the gear train (18) formed here by the toothed wheel (19). This toothed wheel (19) is secured to the shaft (17) bearing a flap (21) closing off a pipe (22). The box (23) of the gear motor is here an integral part of the valve body (16), but can be a separate element from the latter as required. The gear motor is closed by a cover (20) screwed onto the box (23). This gear motor is typically used for metering fluid in an automobile.

Figure 10A:
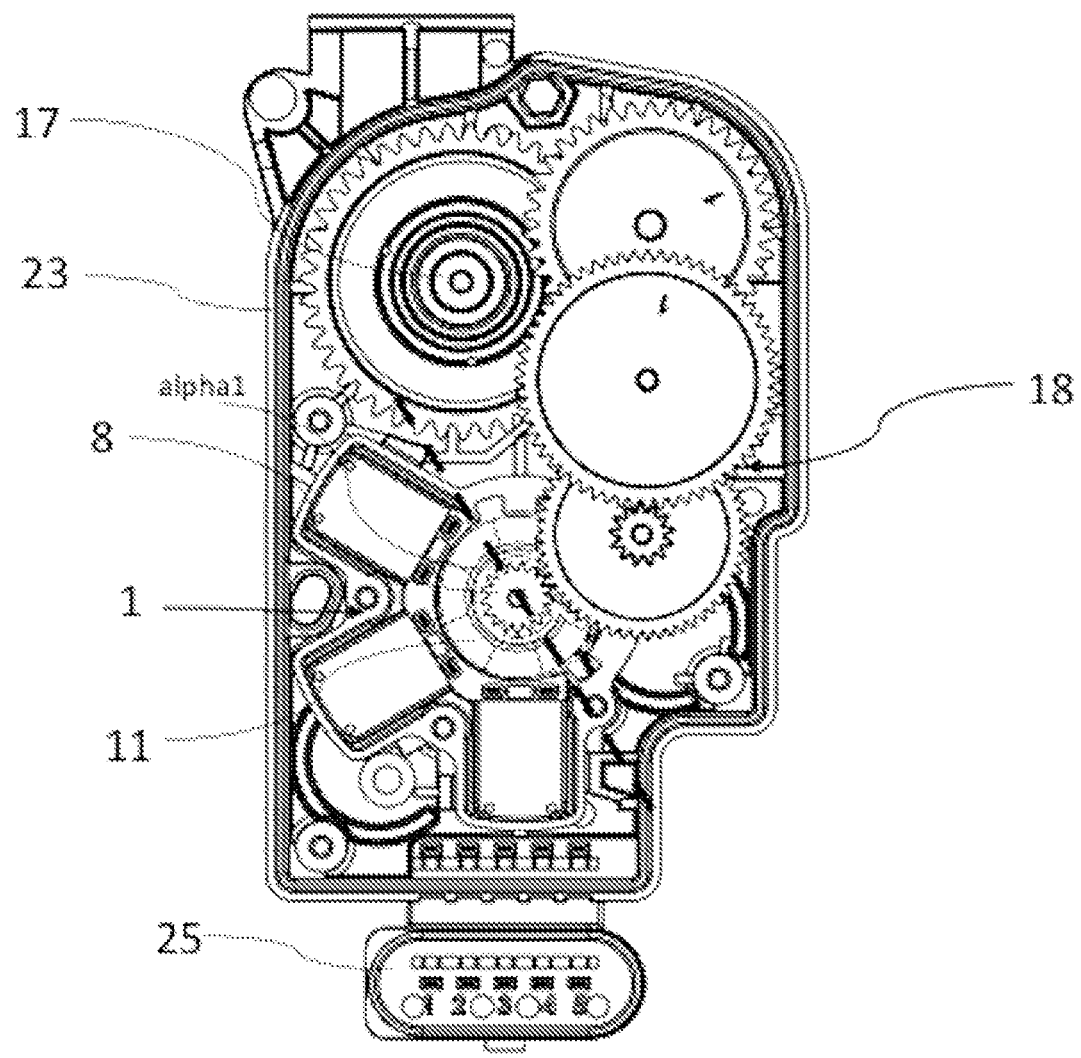
FIGS. 10a and 10b are top and perspective views, respectively, of a second example of a gear motor according to the present disclosure.
Figure 10B:
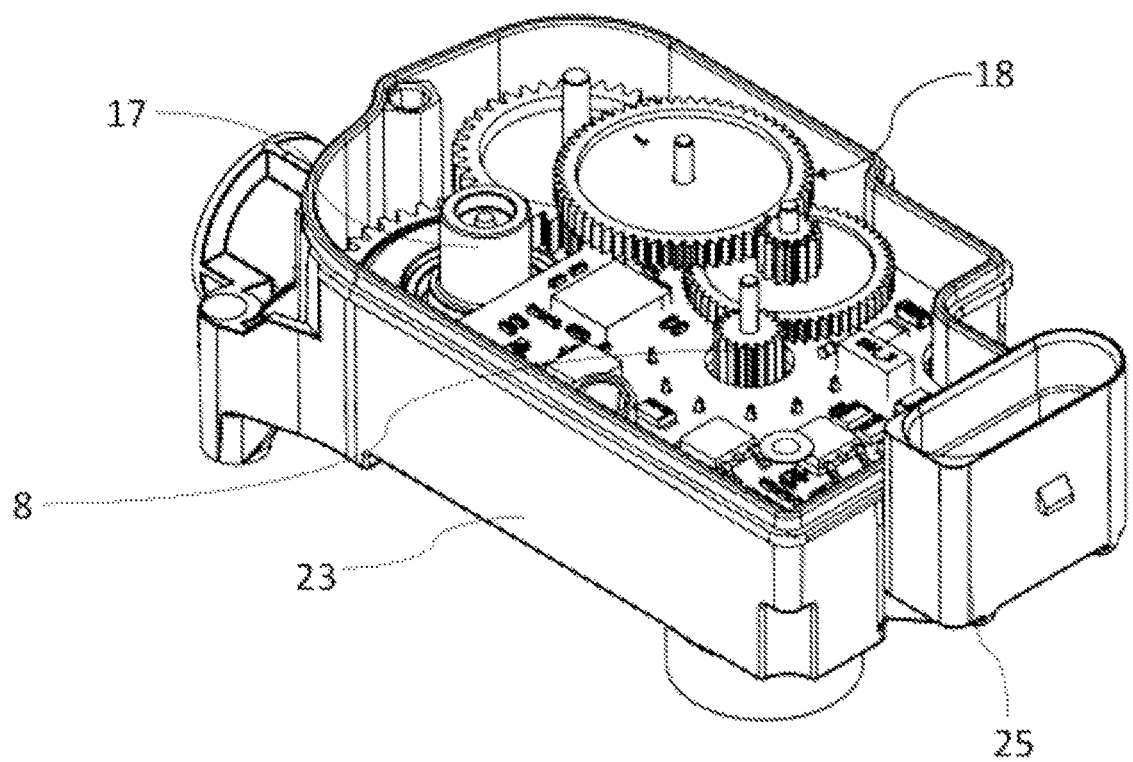

FIGS. 10a and 10b show a second embodiment of a gear motor according to the present disclosure. The motor used is identical to that shown in FIGS. 1c to 1e. The latter is installed in a box (23) containing a gear train (18) including four intermediate wheels forming as many reduction stages moving the output shaft (17). The sector alpha 1 is placed on the side of the walls of the box (23) in order to free up space for the placement of the gear train (18), with the aim of producing an axially compact gear motor. The box (23) is intended to be closed by a cover (not shown), to produce an actuation module to be installed in the intended application. The gear motor here comprises a printed circuit (24) to which the motor coils are connected via the press-fit elements (9) described in FIG. 1d. This printed circuit (24), in particular, comprises the electronic elements necessary to control the electric motor. The box (23) also comprises a connector (25) for connecting the box (23) to an external power supply also allowing the communication of information such as position, usage diagnosis, etc.

Figure 11:
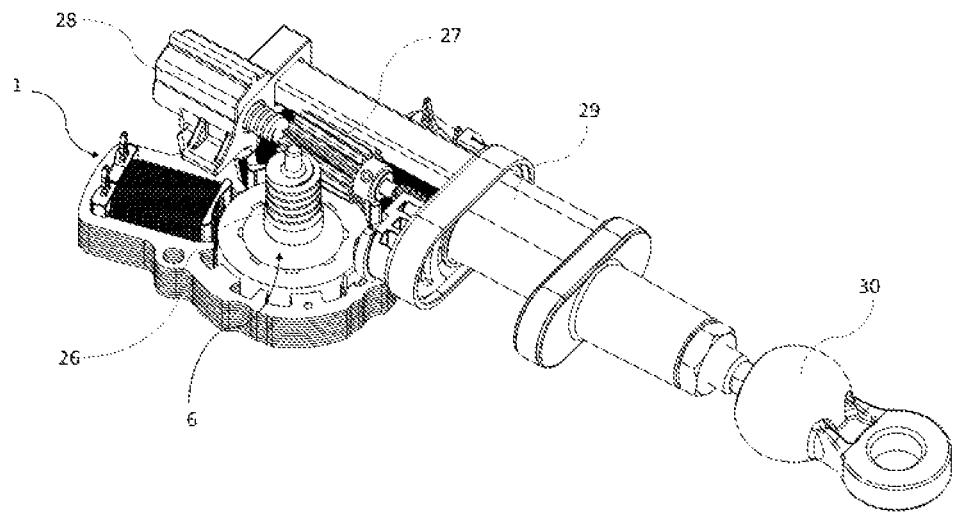
FIG. 11 is a perspective view of a third example of a gear motor according to the present disclosure.

FIG. 11 shows a third embodiment of a gear motor according to the present disclosure. The motor used is identical to that shown in FIGS. 1c to 1e. The latter is associated with a gear train (18) including a worm (26), secured to the rotor (6), associated with a threaded rod (27). The latter is guided by a fixed nut (28) and drives a movable nut (29) secured to a control member (30). The sector alpha 1 is placed partly axially below the threaded rod (27). The produced gear motor assembly is then intended to be integrated into a box (not shown) to be mounted in the application.

Figure 12:
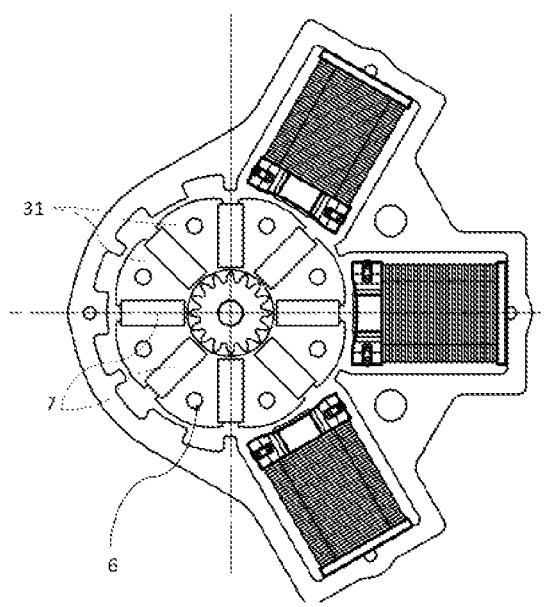
FIG. 12 is a top view of an alternative embodiment of the rotor of a motor belonging to a gear motor according to the present disclosure.

In FIG. 12, an alternative embodiment of a rotor (6) is shown, associated with a stator similar to that of FIG. 1a. This rotor has non-magnetic supports (7) buried in a soft ferromagnetic yoke (31). This embodiment makes it possible, in certain cases, to increase the flux of the rotor and also to reduce the production costs. This rotor is dimensioned according to the teachings of the state of the art in the area.

The invention claimed is:

1. A gear motor, comprising:
a reduction gear train; and
a three-phase electric motor comprising a rotor and a stator, the stator formed by a stack of sheets and a number of electric coils that is a multiple of 3 and a rotor having k*N pairs of magnetized poles, with k=1 or 2, the stator having two separate angular sectors alpha 1 and alpha 2, which are centered on the center of rotation of the motor and comprise an alternation of notches and 3*k*N teeth, which are regularly spaced and converge toward the center of rotation and define a cavity in which the rotor is disposed, wherein N=4 and alpha 1 is less than or equal to 180° and comprises all of the coils of the motor, the number of coils of the motor being less than or equal to half the number of teeth, wherein the teeth all have an identical width such that the width is less than or equal to the notch width.

2. The gear motor of claim 1, wherein the teeth are identical and have pole heads flared toward the rotor such that the width of the pole heads is greater than the notch width.

3. The gear motor of claim 1, wherein the rotor is supported by a non-magnetic support.

4. The gear motor of claim 3, wherein the non-magnetic support comprises an injected material also forming a pinion for driving the reduction gear train.

5. The gear motor of claim 4, wherein k=2, and the gear motor further comprises two coils per electrical phase.

6. The gear motor of claim 5, wherein the reduction gear train includes a worm driving a threaded rod.

7. The gear motor of claim 1, wherein k=2, and the gear motor further comprises two coils per electrical phase.

8. The gear motor of claim 1, wherein the reduction gear train includes a worm driving a threaded rod.

9. A gear motor, comprising:
a reduction gear train; and
a three-phase electric motor comprising a rotor and a stator, the stator formed by a stack of sheets and a number of electric coils that is a multiple of 3 and a rotor having k*N pairs of magnetized poles, with k=1 or 2, the stator having two separate angular sectors alpha 1 and alpha 2, which are centered on the center of rotation of the motor and comprise an alternation of notches and 3*k*N teeth, which are regularly spaced and converge toward the center of rotation and define a cavity in which the rotor is disposed, wherein N=4 and alpha 1 is less than or equal to 180° and comprises all of the coils of the motor, the number of coils of the motor being less than or equal to half the number of teeth, wherein the teeth comprise alternating wide and narrow teeth, the wide teeth having a width greater than or equal to twice the width of the narrow teeth, and wherein the notch width is greater than the width of the narrow teeth.

10. The gear motor of claim 9, wherein the teeth are identical and have pole heads flared toward the rotor such that the width of the pole heads is greater than the notch width.

11. The gear motor of claim 9, wherein the rotor is supported by a non-magnetic support.

12. The gear motor of claim 11, wherein the non-magnetic support comprises an injected material also forming a pinion for driving the reduction gear train.

13. The gear motor of claim 12, wherein k=2, and the gear motor further comprises two coils per electrical phase.

14. The gear motor of claim 13, wherein the reduction gear train includes a worm driving a threaded rod.

15. The gear motor of claim 9, wherein the reduction gear train includes a worm driving a threaded rod.

16. The gear motor of claim 9, wherein k=2, and the gear motor further comprises two coils per electrical phase.

* * * * *